United States Patent
Suda

(10) Patent No.: US 12,519,894 B2
(45) Date of Patent: Jan. 6, 2026

(54) INSPECTION SYSTEM AND IMAGE FORMING APPARATUS THAT DISPLAY A SCREEN FOR SETTING A READ INSPECTION CONDITION

(71) Applicant: CANON KABUSHIKI KAISHA, Tokyo (JP)

(72) Inventor: Takeyuki Suda, Chiba (JP)

(73) Assignee: Canon Kabushiki Kaisha, Tokyo (JP)

(*) Notice: Subject to any disclaimer, the term of this patent is extended or adjusted under 35 U.S.C. 154(b) by 102 days.

(21) Appl. No.: 18/360,916

(22) Filed: Jul. 28, 2023

(65) Prior Publication Data

US 2024/0046448 A1 Feb. 8, 2024

(30) Foreign Application Priority Data

Aug. 4, 2022 (JP) .................................. 2022-124990
Jun. 27, 2023 (JP) .................................. 2023-105339

(51) Int. Cl.
*H04N 1/00* (2006.01)

(52) U.S. Cl.
CPC ..... *H04N 1/00482* (2013.01); *H04N 1/00015* (2013.01); *H04N 1/00034* (2013.01); *H04N 1/00045* (2013.01); *H04N 1/00082* (2013.01)

(58) Field of Classification Search
CPC .......................... H04N 1/00002–00092; H04N 1/00405–0049; H04N 1/00132–00185; H04N 1/60; H04N 1/6027; H04N 1/603; H04N 1/6033; H04N 1/6072; H04N 1/6075; H04N 1/6097; H04N 1/62; H04N 1/624; H04N 1/628; G06K 15/027;
(Continued)

(56) References Cited

U.S. PATENT DOCUMENTS

2005/0088675 A1* 4/2005 Nagoshi ............... H04N 1/6013
358/1.9
2019/0139220 A1* 5/2019 Akiyama ............. H04N 1/0408
(Continued)

FOREIGN PATENT DOCUMENTS

| JP | 2015-221514 A | 12/2015 |
| JP | 2021-014085 A | 2/2021 |
| JP | 2021-149305 A | 9/2021 |

OTHER PUBLICATIONS

Japanese Office Action issued on Mar. 4, 2024, in corresponding Japanese patent application No. 2023-105339, with English translation (8 pages).

*Primary Examiner* — Scott A Rogers
(74) *Attorney, Agent, or Firm* — Venable LLP

(57) ABSTRACT

An inspection system including a reading apparatus configured to read an image formed on a sheet and to output a read image, a display configured to display a setting screen for setting an inspection condition for inspecting the read image, and a processor configured to set the inspection condition including an inspection area of an image, a type of inspection, and an inspection level, wherein the inspection area is automatically set by the processor analyzing a content of a reference image, wherein operation through the setting screen enables displaying the inspection area automatically set by the processor, enabling selection of a specific type of inspection for the inspection area from a plurality of inspection types, and setting an inspection level for the specific type of inspection

14 Claims, 17 Drawing Sheets

(58) Field of Classification Search
CPC ............ G06K 15/1882; G06K 15/1884; G06F 3/1205; G06F 3/1208; G06F 3/1253
See application file for complete search history.

(56) References Cited

U.S. PATENT DOCUMENTS

| | | | | |
|---|---|---|---|---|
| 2020/0051231 | A1* | 2/2020 | Tsukamoto | H04N 1/00063 |
| 2020/0112651 | A1* | 4/2020 | Shimura | G06F 3/1239 |
| 2020/0356318 | A1* | 11/2020 | Wei | G06F 3/1234 |
| 2021/0082100 | A1* | 3/2021 | Tsukamoto | G06T 7/001 |
| 2021/0141577 | A1* | 5/2021 | Ito | G06F 3/1285 |
| 2022/0253257 | A1* | 8/2022 | Ito | G06F 3/1256 |
| 2023/0058026 | A1* | 2/2023 | Murakami | H04N 1/00039 |
| 2023/0142237 | A1* | 5/2023 | Haruta | G06T 7/337 382/112 |
| 2023/0221901 | A1* | 7/2023 | Ito | G06F 3/1256 358/1.13 |
| 2023/0297297 | A1* | 9/2023 | Ishikawa | H04N 1/00074 358/1.15 |
| 2023/0306586 | A1* | 9/2023 | Tanaka | G06F 3/1256 |
| 2024/0015251 | A1* | 1/2024 | Ichihashi | G06T 7/13 |
| 2024/0086663 | A1* | 3/2024 | Hirose | G06F 3/1285 |
| 2024/0087109 | A1* | 3/2024 | Komazawa | G06T 7/001 |
| 2024/0103775 | A1* | 3/2024 | Misawa | G06F 3/1285 |
| 2024/0265523 | A1* | 8/2024 | Murakami | G06T 7/001 |
| 2024/0296538 | A1* | 9/2024 | Suda | G06T 7/0002 |
| 2024/0319931 | A1* | 9/2024 | Kawabe | H04N 1/00005 |
| 2024/0323291 | A1* | 9/2024 | Ikeda | H04N 1/00816 |
| 2024/0354034 | A1* | 10/2024 | Yamazaki | G06F 3/1256 |
| 2024/0357043 | A1* | 10/2024 | Nakayama | G06F 3/1259 |
| 2024/0357044 | A1* | 10/2024 | Akizuki | H04N 1/00769 |
| 2024/0422268 | A1* | 12/2024 | Kobayashi | H04N 1/00037 |
| 2025/0071213 | A1* | 2/2025 | Ohira | H04N 1/00005 |

\* cited by examiner

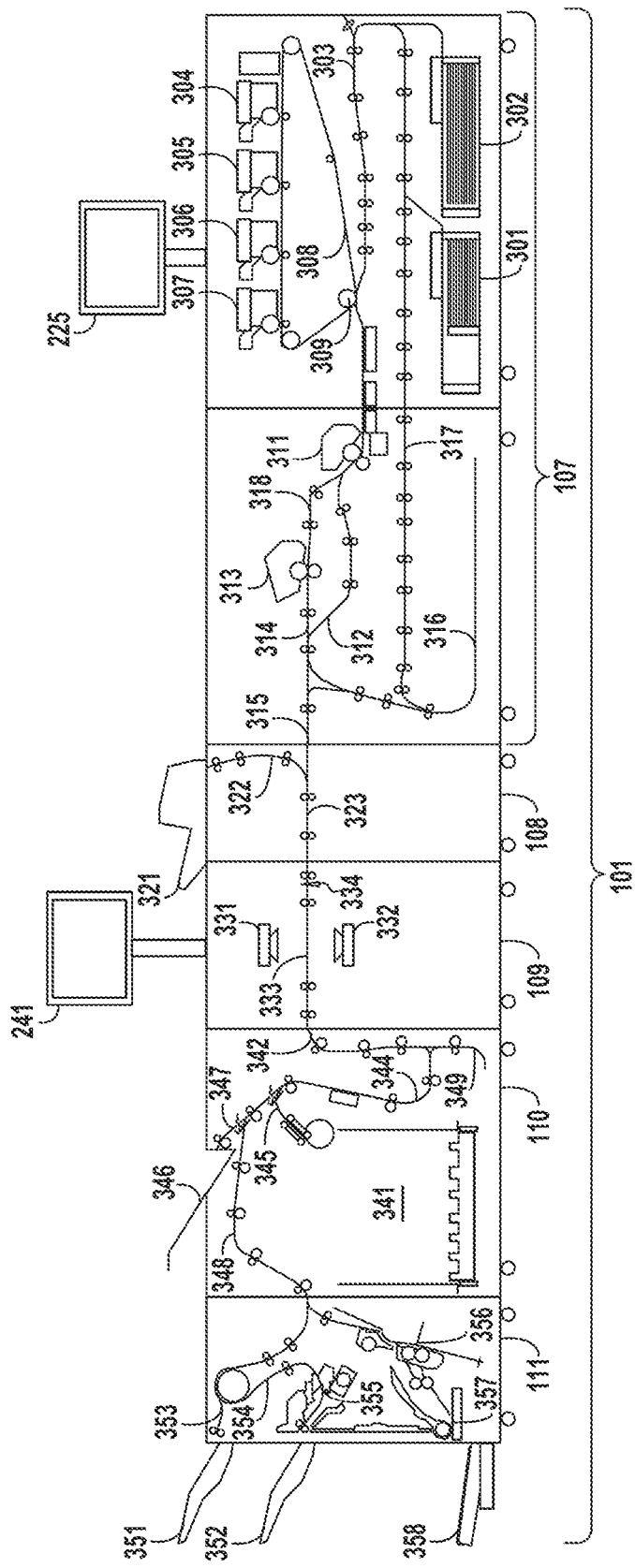

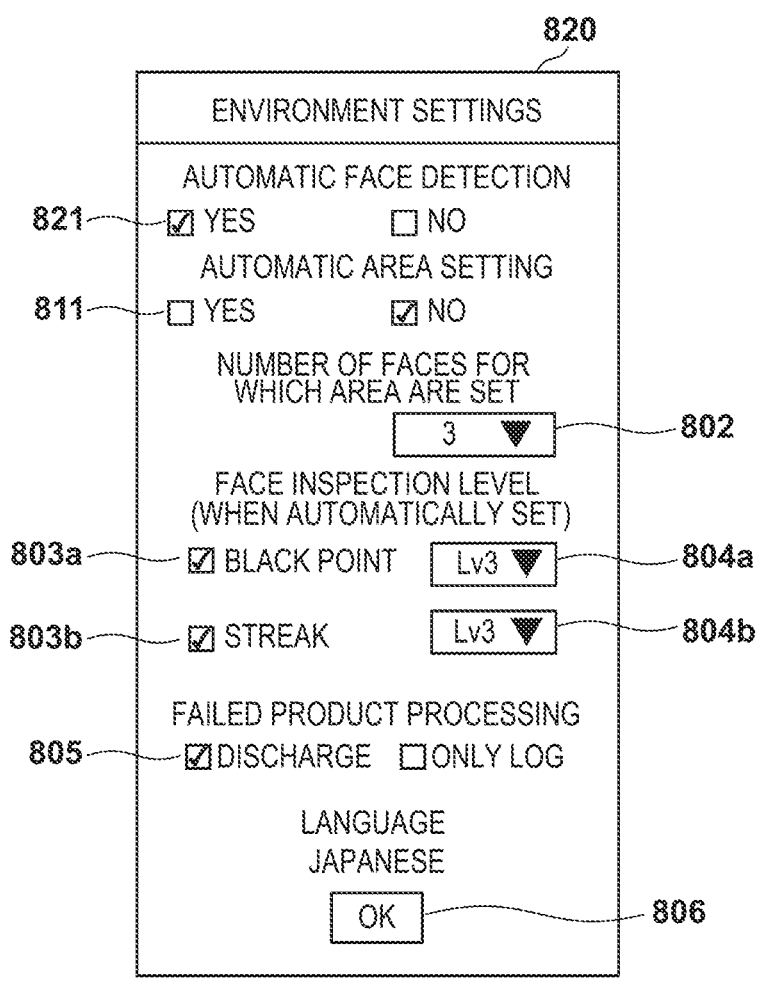

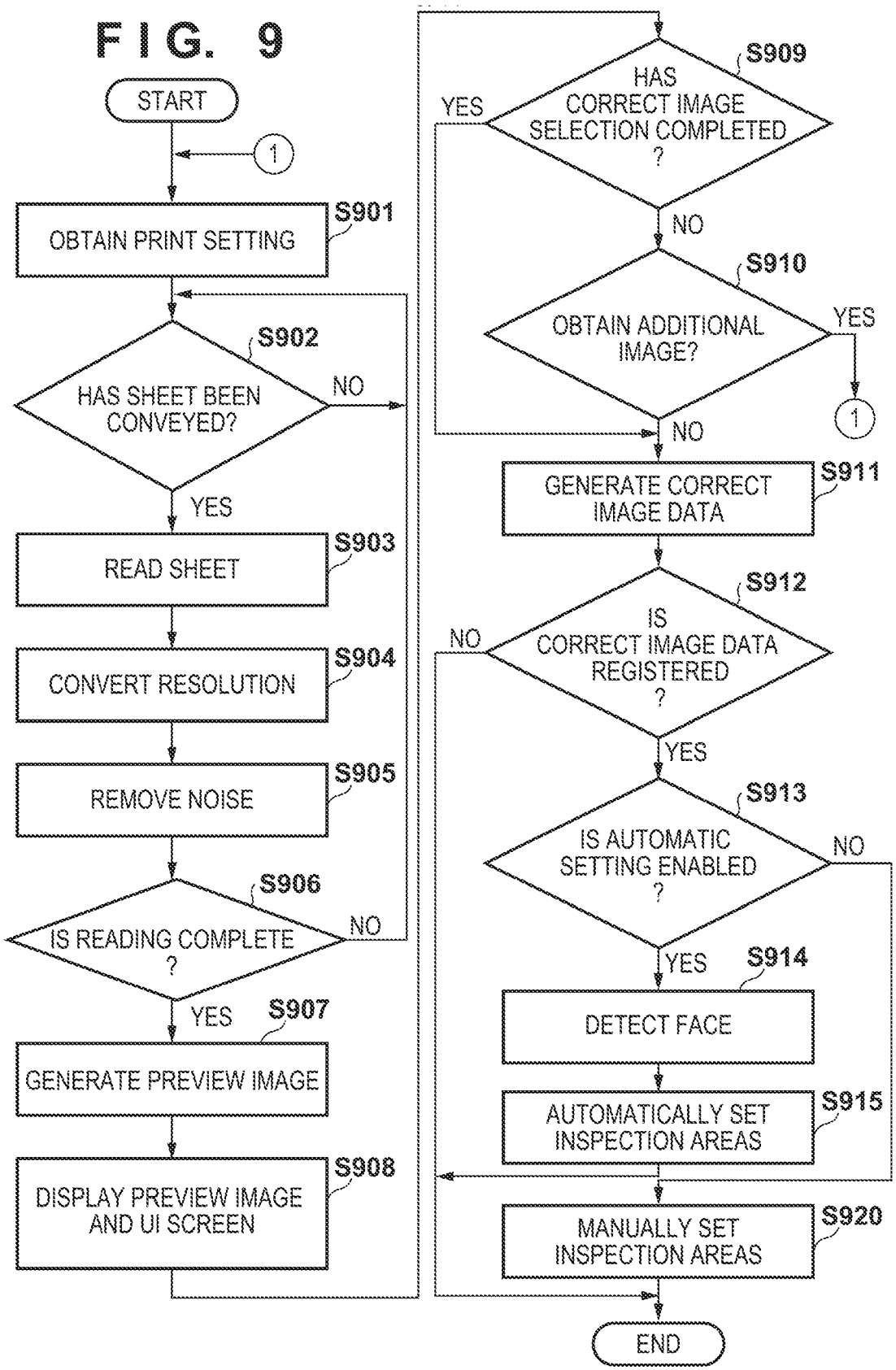

F I G. 13
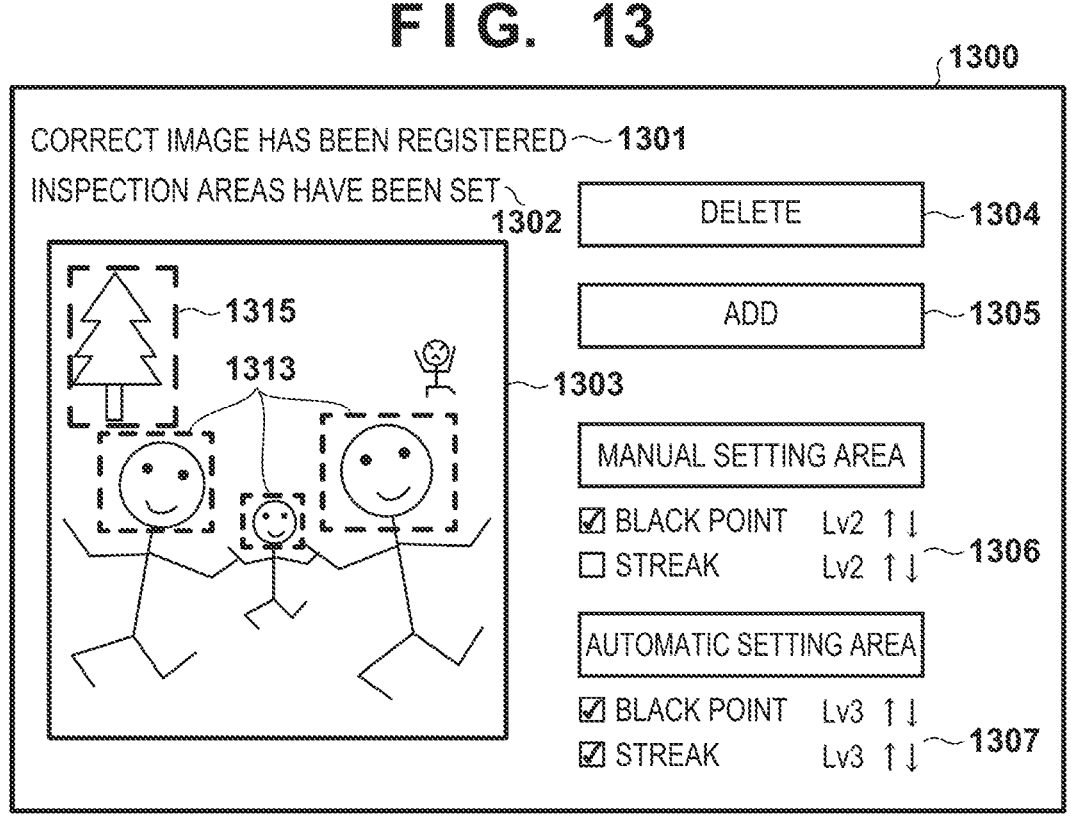
F I G. 14
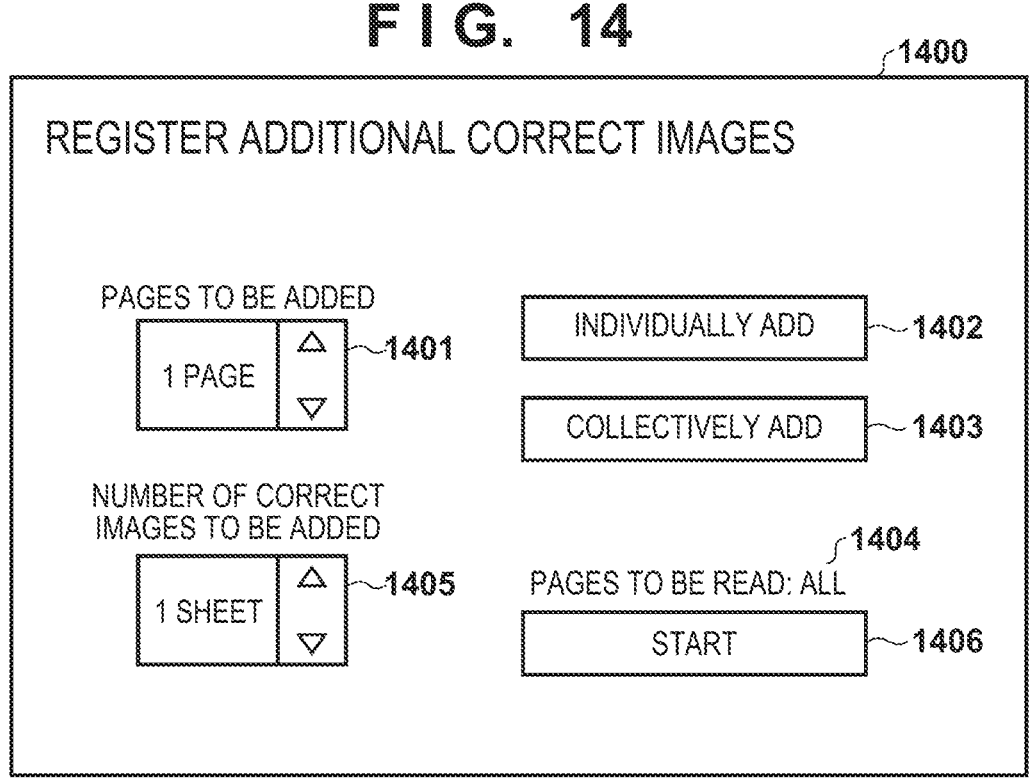

INSPECTION SYSTEM AND IMAGE FORMING APPARATUS THAT DISPLAY A SCREEN FOR SETTING A READ INSPECTION CONDITION

CROSS-REFERENCE TO PRIORITY APPLICATIONS

This application claims the benefit of Japanese Patent Application No. 2022-124990, filed Aug. 4, 2022, and Japanese Patent Application No. 2023-105339, filed Jun. 27, 2023, which are hereby incorporated by reference herein in their entirety.

BACKGROUND OF THE INVENTION

Field of the Invention

The present disclosure relates to a method of inspecting an image printed on a sheet by an image forming apparatus.

Description of the Related Art

Conventionally, there has been proposed a printing system in which an image on a sheet printed by a printing apparatus is inspected by an inspection apparatus (Japanese Patent Laid-Open No. 2021-014085). The inspection apparatus reads an image printed on a sheet and compares the image with a correct image to determine a pass or fail.

In Japanese Patent Laid-Open No. 2021-014085, it is proposed that an area of an image to be inspected by an inspection apparatus within the image printed on a sheet be set as an inspection area, and that the inspection apparatus execute the inspection in the inspection area.

In Japanese Patent Laid-Open No. 2021-014085, the user must register a correct image and set an inspection area by using the correct image. In commercial printing, and the like, a large number of correct images are required. That is, in the configuration described in Japanese Patent Laid-Open No. 2021-014085, the user must manually set an inspection area for each of the plurality of correct images individually, which lacks usability. Meanwhile, in a case when an inspection level is automatically set for a plurality of inspection areas, the user must confirm whether or not the inspection areas for which an inspection level is automatically set are the inspection areas intended by the user. If the inspection level is automatically set for a large number of inspection areas, the confirmation work by the user may increase and usability may be poor.

SUMMARY OF THE INVENTION

The disclosure provides an inspection system comprising a reading apparatus configured to read an image on a sheet while the sheet is being conveyed, a detection unit configured to detect an area of content in a reference image, which is an image that is to be a reference for an inspection of the image on the sheet, a display unit configured to display a setting screen for setting an inspection level corresponding to the area of the content detected by the detection unit, wherein the inspection level indicates a criterion for the inspection of the image; and an inspection unit configured to inspect, based on first image data obtained by the reading apparatus reading an image on a sheet and second image data corresponding to the reference image, an image on the sheet corresponding to the area of content at the inspection level set in the setting screen, wherein, the display unit displays a screen for selecting whether or not to enable setting the inspection level corresponding to the area of the content to be detected by the detection unit.

Further features of the present invention will become apparent from the following description of exemplary embodiments (with reference to the attached drawings).

BRIEF DESCRIPTION OF THE DRAWINGS

FIG. 3 is a view for describing mechanical hardware.
FIG. 8A is a view for describing a UI for environment settings.
FIG. 8B is a view for describing a UI for environment settings.
FIG. 8C is a view for describing a UI for environment settings.
FIG. 9 is a flowchart illustrating a method of registration of correct image data.
FIG. 13 is a view for describing a UI for executing addition/deletion of a correct image.
FIG. 14 is a view for describing a UI for executing an addition of a correct image.

DESCRIPTION OF THE EMBODIMENTS

Figure 1:
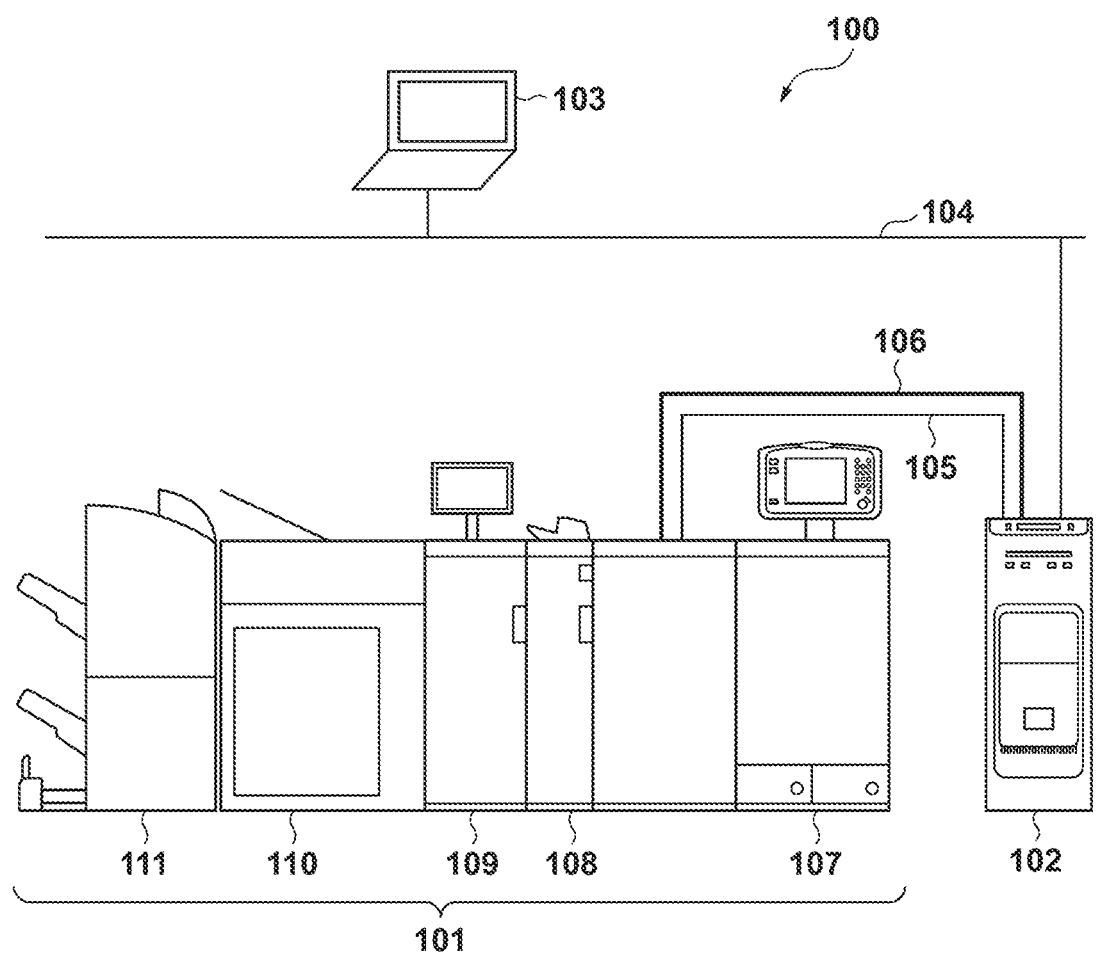
FIG. 1 is a view describing an image processing system.

Hereafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and a redundant description thereof is omitted.

In the following description, an external controller may be referred to as an image processing controller, a digital front end (hereafter referred to as a DFE), a print server, or the like. An image forming apparatus may be referred to as a printer or a multifunction peripheral (MFP). Hereafter, an example of the image processing apparatus will be described. (1) Summary of Image Processing System FIG. 1 is a view for describing an image processing system 100. The image processing system 100 includes an image forming system 101, an external controller 102, and a PC 103. PC is an abbreviation for a personal computer. The PC 103 may be a smart phone or a tablet terminal. The image forming system 101 and the external controller 102 are communicably connected via an internal LAN 105 and a video cable 106. LAN is an acronym for a local area network. The external controller 102 is communicably connected to the PC 103 via an external LAN 104. The PC 103 transmits a print instruction to the external controller 102.

A printer driver is installed on the PC 103. The printer driver converts print data into a print description language (e.g., page description language) that can be processed by the external controller 102. A user performs an instruction to print from various applications via the printer driver. The printer driver transmits the print data to the external controller 102 based on the print instruction from the user.

The external controller 102 receives the print instruction and print data from the PC 103. The external controller 102 analyzes the print data, performs rasterization processing, and transmits the print data to the image forming system 101.

The image forming system 101 is connected to a plurality of apparatuses having different functions, and executes complicated processing such as bookbinding. An image forming apparatus 107 forms an image on a sheet conveyed from a feeding unit at a lower portion of the image forming apparatus 107 using toner. An inserter 108 inserts an insertion sheet into a sheet group printed and conveyed by the image forming apparatus 107 at an arbitrary position. An inspection apparatus 109 reads an image printed on the sheet conveyed from the image forming apparatus 107 and compares the image with correct image data registered in advance to determine whether or not the image printed on the sheet passes. If the image fails, the inspection apparatus 109 changes the sheet discharge operation. A large-capacity stacker 110 can stack and store a large-capacity of sheets. A finisher 111 performs finishing processing on the conveyed sheets. The finishing processing includes, for example, stapling, punching, saddle stitching, or the like. A product on which the finishing processing has been applied is discharged to a discharge tray.

The external controller 102 is connected to the image forming system 101, but this is merely an example. The image forming system 101 may be connected to the external LAN 104, and the print data may be transmitted from the PC 103 to the image forming system 101. In this case, the image forming system 101 executes analysis, rasterization processing, and the like, on the print data.

(2) Electronic Hardware

Figure 2:
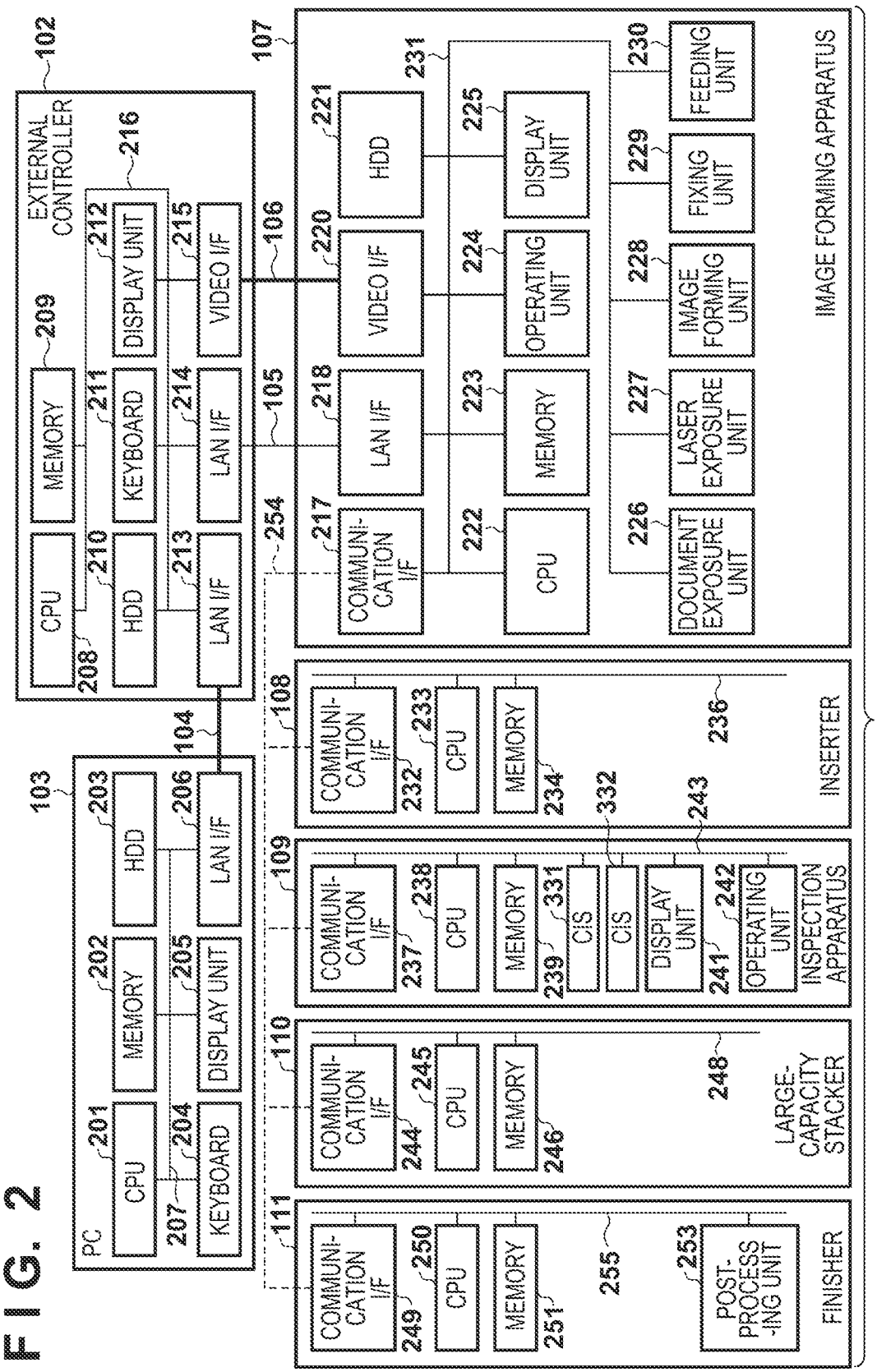
FIG. 2 is a view for describing electronic hardware.

FIG. 2 is a block diagram illustrating electronic hardware of the image forming system 101, the external controller 102, and the PC 103. Note that the functions described below may be realized by at least one processor.

Image Forming Apparatus

The image forming apparatus 107 includes a communication I/F 217, a LAN I/F 218, a video I/F 220, a hard disk drive (HDD) 221, a CPU 222, a memory 223, an operation unit 224, and a display 225. I/F is an abbreviation for interface. CPU is an abbreviation for central processing unit. The image forming apparatus 107 further includes a document exposure unit 226, a laser exposure unit 227, an image forming unit 228, a fixing unit 229, and a feeding unit 230. These constituent elements are connected via a system bus 231.

The communication I/F 217 is a communication circuit connected to the inserter 108, the inspection apparatus 109, the large-capacity stacker 110, and the finisher 111 via a communication cable 254. The LAN I/F 218 is a communication circuit connected to the external controller 102 via the internal LAN 105. The LAN I/F 218 receives, for example, print data, and the like, from the external controller 102. The video I/F 220 is a communication circuit connected to the external controller 102 via the video cable 106. The video I/F 220 receives image data, and the like, from the external controller 102.

The HDD 221 stores programs and data. The CPU 222 loads a program stored in the HDD 221 into the memory 223 and executes the loaded program to execute image processing control, print control, and the like. The memory 223 includes a random access memory (RAM) and a read-only memory (ROM). The memory 223 stores programs, image data, and the like, that are required when the CPU 222 performs various processing. The operation unit 224 is an input device that accepts an input of various settings and operation instructions from a user. The display 225 presents and displays setting information of the image forming system 101, the processing status of the print job, and the like to the user. The display 225 may have a touch panel function as a part of the operation unit 224.

The document exposure unit 226 is an image reading apparatus that reads a document and generates image data when a copy function and a scan function are used. The document exposure unit 226 illuminates, with an exposure lamp, a document placed on a platen glass or a document fed from a document feeding unit (not illustrated) by a user, and generates image data by reading the document with an image sensor. The laser exposure unit 227 uniformly charges the surface of a photosensitive drum and irradiates the photosensitive drum with a laser beam to form an electrostatic latent image. The image forming unit 228 is an apparatus that transfers toner to a sheet, and includes a developing unit, a transfer unit, a toner supply unit, and the like. The developing unit forms a toner image by causing toner to adhere from a developing cylinder to the electrostatic latent image on the surface of the photosensitive drum. The transfer unit applies a positive potential to a primary transfer roller and transfers the toner from the surface of the photosensitive drum to the intermediate transfer belt (primary transfer). The transfer unit applies a positive potential to a secondary outer transfer roller and transfers the toner from the intermediate transfer belt to the sheet (secondary transfer). The fixing unit 229 includes a heater, a fixing belt, a pressure belt, and the like, and fixes to the sheet the toner image that has been transferred to the sheet by heat and pressure. The feeding unit 230 is an apparatus for feeding a sheet to be used for printing to the image forming unit 228, and a sheet feeding operation and a conveyance operation are controlled by rollers and various sensors.

Inserter

The inserter 108 includes a communication I/F 232, a CPU 233 and a memory 234, and each constituent element is connected via a system bus 236. The communication I/F 232 is connected to the image forming apparatus 107 via a communication cable 254, and is a communication circuit that executes communication required for performing control. The CPU 233 executes a control program stored in the memory 234 to perform various kinds of control required for sheet feeding. The memory 234 is a storage apparatus that stores the control program. The CPU 233 controls the feeding unit of the inserter 108 and controls the feeding and the conveyance of sheets conveyed from the image forming apparatus 107 while controlling the rollers and the sensors according to the control program.

Inspection Apparatus

The inspection apparatus 109 includes a communication I/F 237, a CPU 238, a memory 239, a CIS 331, a CIS 332, a display 241, and an operation unit 242. These elements are connected to each other via a system bus 243. CIS is an abbreviation for a contact image sensor. The communication I/F 237 is connected to the image forming apparatus 107 via the communication cable 254, and is a communication circuit that executes communication required for performing control. The CPU 238 performs various kinds of control required for inspection in accordance with a control program stored in the memory 239. The memory 239 is a storage apparatus that stores the control program. The CIS 331 and the CIS 332 read a conveyed sheet based on an instruction from the CPU 238. The CIS 331 and the CIS 332 read, not only printed materials to be inspected, but also, read printed materials that are candidates for correct images in order to register correct image data. That is, image data is obtained from a plurality of printed materials that are candidates for correct images. The CPU 238 applies image processing (e.g., resolution conversion, noise removal, superimposition, and averaging) to the image data, generates correct image data, and stores the correct image data in the memory 239. Note, the correct image data may be, for example, RIP image data transmitted from the PC 103.

The CPU 238 compares the image data to be inspected obtained by the CIS 331 and the CIS 332 with the correct image data stored in the memory 239, and determines whether or not the printed image (sheet) passes. The CPU 238 instructs the conveyance control of a sheet determined to be a failure. The display 241 displays an inspection result, a setting screen, and the like. The operation unit 242 is operated by a user and accepts instructions for changing of a setting of the inspection apparatus 109, for registering correct image data, and the like.

Large-Capacity Stacker

The large-capacity stacker 110 includes a communication I/F 244, a CPU 245, and a memory 246. These elements are connected to each other via a system bus 248. The communication I/F 244 is connected to the image forming apparatus 107 via the communication cable 254, and is a communication circuit that executes communication required for performing control. The CPU 245 executes a control program stored in the memory 246 to perform various kinds of control required for discharging. The memory 246 is a storage apparatus that stores the control program. The CPU 245 causes a conveyed sheet to be conveyed to a stack tray 341, an escape tray 346, or the subsequent finisher 111 according to the control program.

Finisher

The finisher 111 includes a communication I/F 249, a CPU 250, a memory 251, and a post-processing unit 253. These elements are connected to each other via a system bus 255. The communication I/F 249 is connected to the image forming apparatus 107 via the communication cable 254, and is a communication circuit that executes communication required for performing control. The CPU 250 executes a control program stored in the memory 251 to perform various kinds of control required for finishing and discharging. The memory 251 is a storage apparatus that stores a control program, and the like. The CPU 250 controls conveyance and discharge of a sheet according to the control program. The post-processing unit 253 executes finishing processing such as stapling, punching, and saddle stitching based on an instruction from the CPU 250.

External Controller

External controllers 102 include a CPU 208, a memory 209, an HDD 210, a keyboard 211, a display 212, an LAN I/F 213, an LAN I/F 214, and a video I/F 215. These elements are connected to each other via a system bus 216. The CPU 208 loads the program stored in the HDD 210 into the memory 209 and executes the loaded program. The CPU 208 receives print data from the PC 103, executes RIP processing, and transmits print data to the image forming system 101. The memory 209 stores programs and data that are required when the CPU 208 performs various processing. The HDD 210 stores programs and data required for operations such as print processing. The keyboard 211 accepts an operation instruction from the external controller 102, and inputs the operation instruction to the CPU 208. The display 212 displays information, a still image, and a moving image of an application being executed by the external controller 102. The LAN I/F 213 is connected to the PC 103 via the external LAN 104, and is a communication circuit that executes communication such as a print instruction. The LAN I/F 214 is connected to the image forming system 101 via the internal LAN 105, and is a communication circuit that executes communication such as a print instruction. The video I/F 215 is connected to the image forming system 101 via the video cable 106, and is a communication circuit that executes communication of data such as print data.

PC (Information Processing Apparatus)

The PC 103 includes a CPU 201, a memory 202, an HDD 203, a keyboard 204, a display 205, and an LAN I/F 206. These elements are connected to each other via a system bus 207. The CPU 201 loads a document processing program or the like stored in the HDD 203 into the memory 202, and executes the loaded program to create print data and then executes a print instruction. The CPU 201 executes a print instruction for adding a pattern designated by the user to the background of the print data. The pattern may include a pattern indicating a device-specific number of the image forming apparatus 107. The CPU 201 may add the pattern to the background by shifting the position of the pattern on a page-by-page basis. The CPU 201 comprehensively controls each device connected to the system bus 207. The memory 202 stores programs and data that are required when the CPU 201 performs various processing. The HDD 203 stores programs and data required for operations such as print processing. The keyboard 204 is an input device that accepts operations and instructions to the PC 103. The display 205 displays information, still images, and moving images of an application being executed by the PC 103. The LAN I/F 206 is connected to the external LAN 104, and is a communication circuit that executes communication such as a print instruction.

In FIG. 2, the external controller 102 and the image forming system 101 are connected to each other via the internal LAN 105 and the video cable 106, but this is merely an example. It is sufficient to transmit and to receive data necessary for printing. For example, a configuration may be such that the external controller 102 and the image forming system 101 are connected only by a video cable. The memory 202, the memory 209, the memory 223, the memory 234, the memory 239, the memory 246, and the memory 251 may be storage apparatuses that each can hold data and programs. For example, these can be substituted with a volatile RAM, a non-volatile ROM, an internal HDD, an external HDD, a USB memory, or the like.

(3) Mechanical Hardware

FIG. 3 is a structural cross-sectional view simply illustrating mechanical hardware of the image forming system 101.

Image Forming Apparatus

The image forming apparatus 107 prints an image on a sheet fed from feeding apparatuses 301 and 302 constituting the feeding unit 230. The feeding apparatuses 301 and 302 may be referred to as feeding decks, sheet cassettes, or sheet trays. The feeding apparatuses 301 and 302 separate an uppermost sheet from a plurality of sheets and convey the sheet to a conveyance path 303. Development stations 304 to 307 form toner images using yellow "Y", magenta "M", cyan "C", and black "K" colored toners, respectively, to form color images. Each of the development stations 304 to 307 includes the laser exposure unit 227 and the image forming unit 228. The laser exposure unit 227 outputs a light beam such as a laser beam modulated according to the image data. The laser beam is reflected by a rotating polygon mirror, such as a polygon mirror, and is irradiated onto a photosensitive drum. As a result, an electrostatic latent image is formed on the photosensitive drum. The electrostatic latent image is developed by the toner and becomes a toner image. This series of image forming processes is executed for each toner of YMCK. An intermediate transfer belt 308 conveys each toner image of YMCK to a secondary transfer unit 309. The secondary transfer unit 309 transfers the toner image to the sheet conveyed through the conveyance path 303. The display 225 displays information necessary for the printing status and settings of the image forming system 101.

The fixing unit 229 includes fixing units 311 and 313. The fixing unit 311 fixes the toner image that has been transferred on the sheet to the sheet. The fixing unit 311 includes a pressure roller and a heating roller. When a sheet passes between the pressure roller and the heating roller, the toner melts and the melted toner is pressure bonded onto the sheet. As a result, the toner image is fixed to the sheet. After passing through the fixing unit 311, the sheet is conveyed to a conveyance path 315 through a conveyance path 312. Depending on the type of sheet, further melting and pressure bonding may be required. In such a case, after passing through the fixing unit 311, the sheet is conveyed to the fixing unit 313 through a conveyance path 318. Here, after additional melting and pressure have been applied, the sheet is conveyed to a conveyance path 315 through a conveyance path 314. In a case when the image forming mode is double-sided, the sheet is conveyed to a reversing path 316, and the traveling direction of the sheet is reversed. Accordingly, the image forming surface is changed from the first surface to the second surface of the sheet. Thereafter, the sheet passes through a conveyance path 317 and is conveyed to the conveyance path 303 again. The secondary transfer unit 309 transfers an image to the second surface of the sheet.

Inserter

The inserter 108 includes an inserter tray 321. An insertion sheet stacked on the inserter tray 321 is conveyed through a conveyance path 322 and transferred to a conveyance path 323. As a result, the insertion sheet is inserted at an arbitrary position among the series of sheets conveyed from the image forming apparatus 107. The conveyance path 323 conveys the sheet to a subsequent apparatus (inspection apparatus 109).

Inspection Apparatus

The sheet that has passed through the inserter 108 is conveyed to the inspection apparatus 109. The CIS 331 is arranged above the conveyance path 333 and reads one side of the sheet. The CIS 332 is arranged below the conveyance path 333 and reads the other side of the sheet. The CIS 331 and the CIS 332 may be replaced with a line scan camera. The inspection apparatus 109 reads an image of the sheet using the CIS 331 and the CIS 332 at a timing when the sheet conveyed to a conveyance path 333 reaches a predetermined position, and determines whether the image satisfies pass criteria. The display 241 displays an inspection result, and the like. The CPU 238 determines the timing at which the sheet reaches the predetermined position (reading start timing) based on the timing at which a sheet sensor 334 detects the leading edge of the sheet (detection timing). Normally, the difference between the detection timing and the reading start timing is a fixed value.

The inspection apparatus 109 inspects an image (inspection target) formed on the sheet according to a preset inspection item. That is, the inspection apparatus 109 compares correct image data set in advance with the image data to be inspected. Examples of methods of comparing the image data include comparing pixel values for each image position, comparing the positions of objects extracted by edge detection, comparing character data extracted by Optical Character Recognition (OCR), and the like. Examples of the inspection item include a print position, a color tone of an image, a density of an image, a streak or a blur, a black dot, a print dropout, and the like. Note that the image inspection may be performed as follows. For example, the inspection content may be "positional deviation". The inspection apparatus 109 may determine a pass if the deviation amount between the position of the correct image and the position of the inspection image is equal to or less than the determination threshold. If the deviation amount exceeds the determination threshold value, the inspection apparatus 109 may determine a fail. Also, the inspection content may be set to a "black dot". The inspection apparatus 109 may determine a pass if the size of black dots that are not in the correct image and are in the inspection image is equal to or less than a determination threshold. Configuration may be such that, if the size of such a black dot exceeds the determination threshold, the inspection apparatus 109 will determine a fail. Note that, in the present embodiment, "positional deviation" and "black dot" are described as the inspection contents, but these merely examples. In the present embodiment, in a case when the inspection content is "positional deviation", the inspection is performed on the relative position between the correct image and the inspection image, but this is merely an example. For example, the absolute position of the inspection image with respect to the edge of the sheet may be inspected. In this case, if the distance between the absolute position of the correct image and the absolute position of the inspection image is equal to or less than the determination threshold, a pass is determined. If the distance exceeds the determination threshold, a fail is determined.

Large-Capacity Stacker

The large-capacity stacker 110 includes the stack tray 341 as a tray for stacking sheets. A conveyance path 342 conveys a sheet that has passed through the inspection apparatus 109 to a conveyance path 344. The conveyance path 344 conveys the sheet to a conveyance path 345. The conveyance path 345 conveys the sheet to the stack tray 341. As a result, the sheet is stacked on the stack tray 341.

The large-capacity stacker 110 includes the escape tray 346 as a discharge tray. The escape tray 346 is a tray to which sheets determined to be failures by the inspection apparatus 109 are discharged. In a case when a sheet is discharged to the escape tray 346, the conveyance path 344 conveys the sheet to a conveyance path 347. The conveyance path 347 conveys the sheet to the escape tray 346.

When the sheet is conveyed to the finisher 111 connected to the subsequent stage of the large-capacity stacker 110, the conveyance path 344 conveys the sheet to a conveyance path 348. The conveyance path 348 conveys the sheet to the finisher 111.

A reversing unit 349 is a conveyance path for reversing the front and the back of the sheet. By reversing the front and back of the sheet, face-down discharge is realized or face-up discharge is realized. Face-down discharge refers to discharging a sheet such that an image forming surface faces downward in a single-sided print mode. Face-up discharge refers to discharging a sheet such that a first surface on which the image has been initially formed faces upward in a double-sided print mode. This causes the image forming surface of the sheet to face in a direction intended by the user. In a case when the sheet is conveyed to the escape tray 346 or the finisher 111, the reversing unit 349 need not execute the reversing of the sheet.

Finisher

The finisher 111 applies finishing processing to the conveyed sheet in accordance with a function designated by the user. The post-processing unit 253 includes a stapler unit 355 that executes stapling (one-position/two-position binding) or punching (two-hole/three-hole) and a saddle stitching unit 356 that executes saddle stitching. The finisher 111 has two discharge trays 351 and 352. The conveyance path 353 discharges a sheet received from the large-capacity stacker 110 to the discharge tray 351. However, the conveyance path 353 cannot execute finishing processing such as stapling. In a case when finishing processing such as stapling is required, a conveyance path 354 conveys the sheet received from the large-capacity stacker 110 to the stapler unit 355. The stapler unit 355 executes finishing processing (punching or stapling) designated by the user, and discharges the sheet to the discharge tray 352. The discharge trays 351 and 352 can each be raised and lowered. The CPU 250 may lower the discharge tray 351 and discharge a sheet on which the finishing processing by the stapler unit 355 has been applied to the discharge tray 351. In a case when saddle stitching is designated, the saddle stitching unit 356 executes stapling at the center of the sheet, and, further, the sheet is folded in half and then conveyed by a conveyance path 357. The conveyance path 357 discharges the sheet to a bookbinding tray 358. The bookbinding tray 358 includes a belt conveyor, and conveys a bookbinding bundle stacked on the bookbinding tray 358 to the left side in FIG. 3.

(4) Flowchart (Registration Processing of Correct Image Data)

External Controller

Figure 4A:
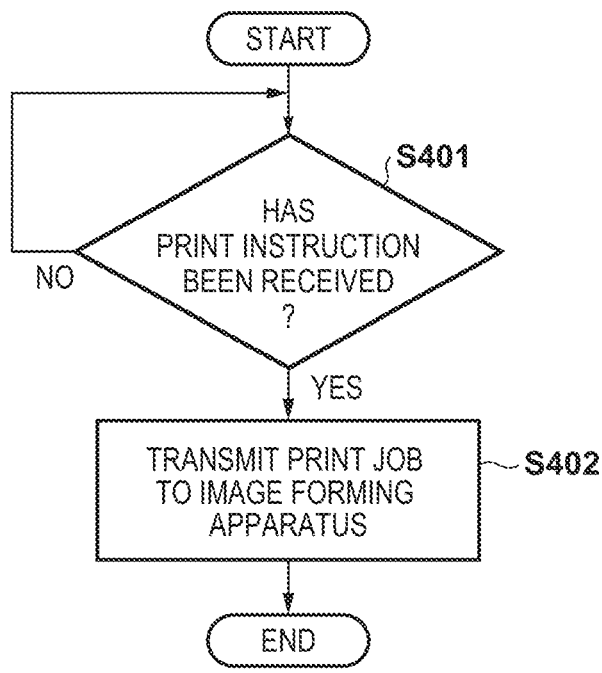
FIG. 4A is a flowchart illustrating processing of an external controller.

FIG. 4A illustrates processing executed by the CPU 208 of the external controller 102 according to a program. Here, it is assumed that the PC 103 transmits a print instruction of the correct image to the external controller 102 in order to register the correct image data in the inspection apparatus 109.

In step S401, the CPU 208 determines whether or not an instruction to print a correct image has been received from the PC 103. In a case when the print instruction is received, the CPU 208 advances the processing from step S401 to step S402. In step S402, the CPU 208 transmits a print job of the correct image to the image forming apparatus 107.

Image Forming Apparatus

Figure 4B:
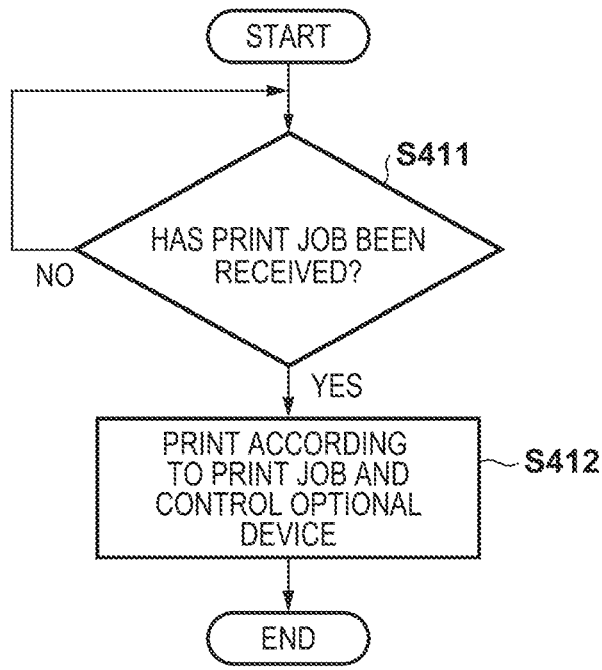
FIG. 4B is a flowchart illustrating processing of an image forming apparatus.

FIG. 4B illustrates processing executed by the CPU 222 of the image forming apparatus 107 according to a program. Here, it is assumed that the print job of the correct image is transmitted from the external controller 102.

In step S411, the CPU 222 determines whether a print job has been received from the external controller 102. When a print job is received, the CPU 222 advances the processing from step S411 to step S412.

In step S412, the CPU 222 controls optional devices while controlling printing according to the print job received from the external controller 102. The print job may include image data of a correct image, identification information of a feeding apparatus that feeds a sheet, and identification information of a tray that serves as a discharge destination of the sheet. The CPU 222 controls optional devices (the inserter 108, the inspection apparatus 109, the large-capacity stacker 110, and the finisher 111) via the communication cable 254 according to the print job.

Inspection Apparatus

Figure 5:
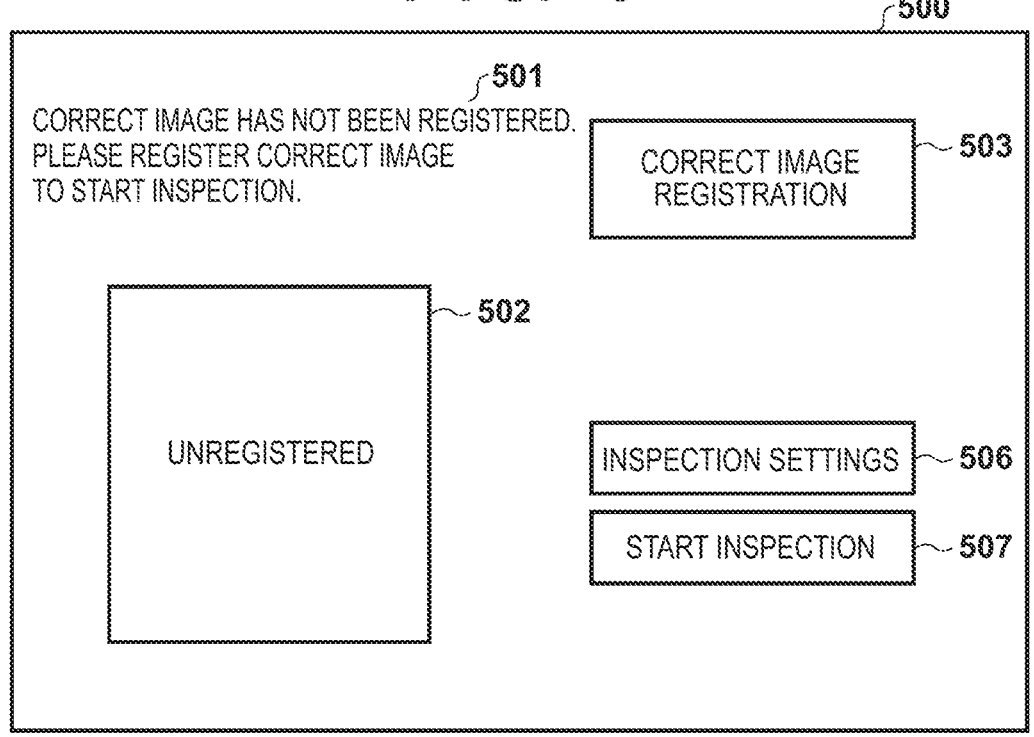
FIG. 5 is a view for describing a user interface (UI) for registering correct image data.

FIG. 5 illustrates an exemplary UI screen 500 displayed on the display 241 when the inspection apparatus 109 is activated. UI is an abbreviation for a user interface. A message 501 is a message describing to the user that correct image data needs to be registered in order to start an inspection because correct image data is not registered. In a case when the correct image data has already been registered, the message 501 indicates that the inspection processing can be started.

An area 502 displays registered correct image data. In FIG. 5, since no correct image data is registered yet, the area 502 displays the text "unregistered".

A button 503 is a button for calling a correct image data registration screen. A button 506 is a button for calling a setting screen for inspection. The CPU 238 accepts an inspection item and an inspection level (a condition for determining a pass or a fail) according to the inspection purpose of the user through the setting screen. A button 507 is a button for instructing to start the inspection. When the button 507 is pressed, the inspection apparatus 109 starts inspection of the image of the sheet that has been conveyed.

Figure 6:
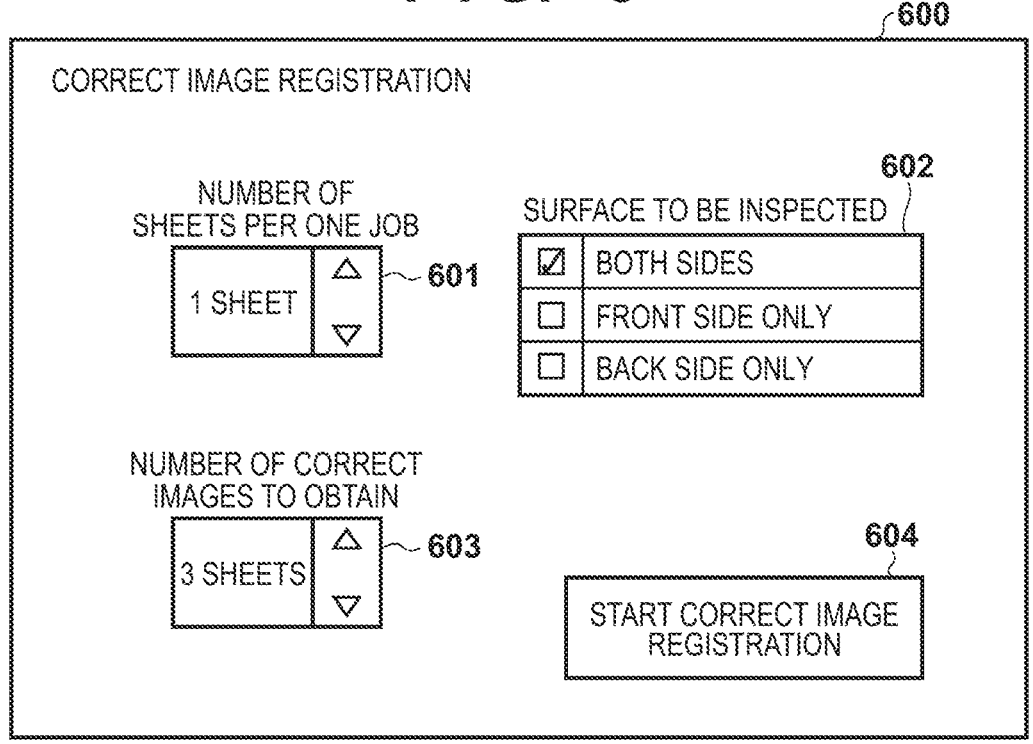
FIG. 6 is a view for describing a UI for registering correct image data.

FIG. 6 is a view illustrating an example of a registration screen 600 of correct image data. When the CPU 238 detects that the button 503 is pressed, the CPU 238 displays the registration screen 600 on the display 241. An up-down button 601 is a setting unit for setting the number of sheets to be inspected (the number of sheets per set). In a case when a set is composed of two or more sheets (images or pages), the CPU 238 can register a plurality of correct images. A check box 602 is a setting unit that sets a surface to be inspected. Either both sides of the sheet, the front side only, or the back side only, are set as the inspection target. In the single-sided print mode, both sides may be selected as an inspection target in order to inspect that the non-printed side of the image is free of dust. In the example of FIG. 6, both sides are selected as an inspection target. An up-down button 603 is a setting unit for setting the number of read images to be the source of the correct image data. For example, the CPU 238 reads M sheets to obtain M pieces of image data, and superimposes and averages the M pieces of image data to generate correct image data. A registration start button

604 is a button for instructing the CPU 238 to start registration of correct image data. When the CPU 238 detects that the registration start button 604 is pressed, the CPU 238 reads an image of the conveyed print sheet and registers correct image data based on the read image.

Figure 7:
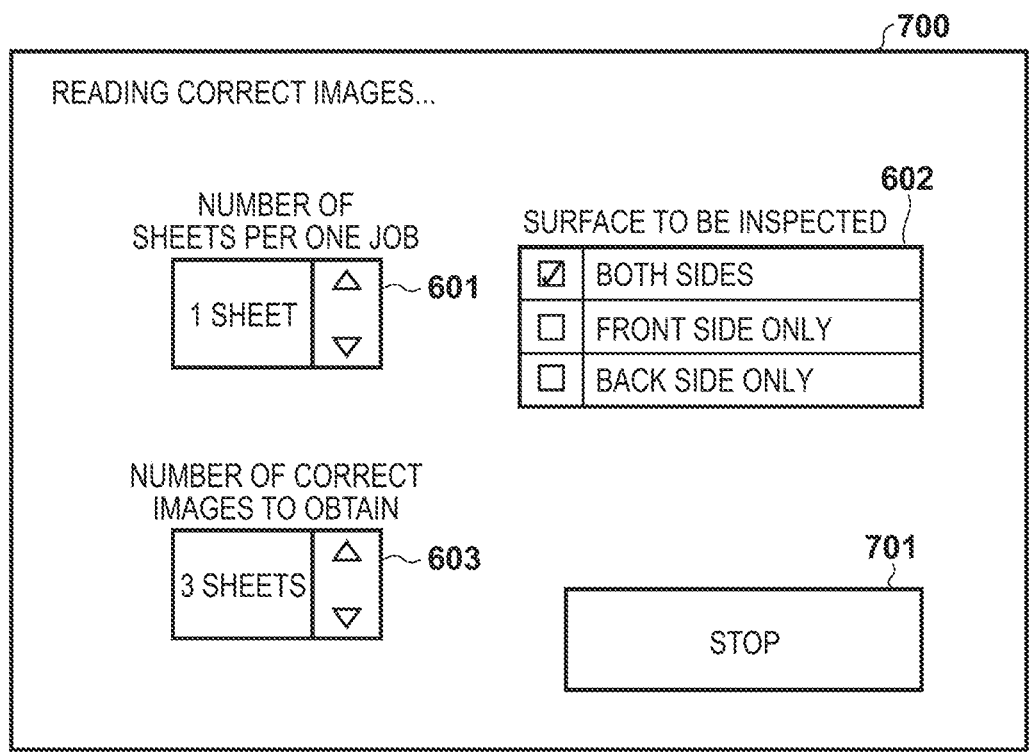
FIG. 7 is a view for describing a UI for registering correct image data.

FIG. 7 illustrates an exemplary UI screen 700 displayed on the display 241 during the reading of the correct image started by the registration start button 604. In the UI screen 700, the registration start button 604 is merely changed to a stop button 701. The CPU 238 continuously displays the UI screen 700 on the display 241 until the reading of the M sheets set by the up-down buttons 601 and 603 is completed. A stop button 701 is a button for instructing the CPU 238 to stop the reading of the correct image. In a case when the stop button 701 is pressed, the CPU 238 returns the UI screen 700 to the registration screen 600 without registering correct image data.

Figures 8A, 8B:
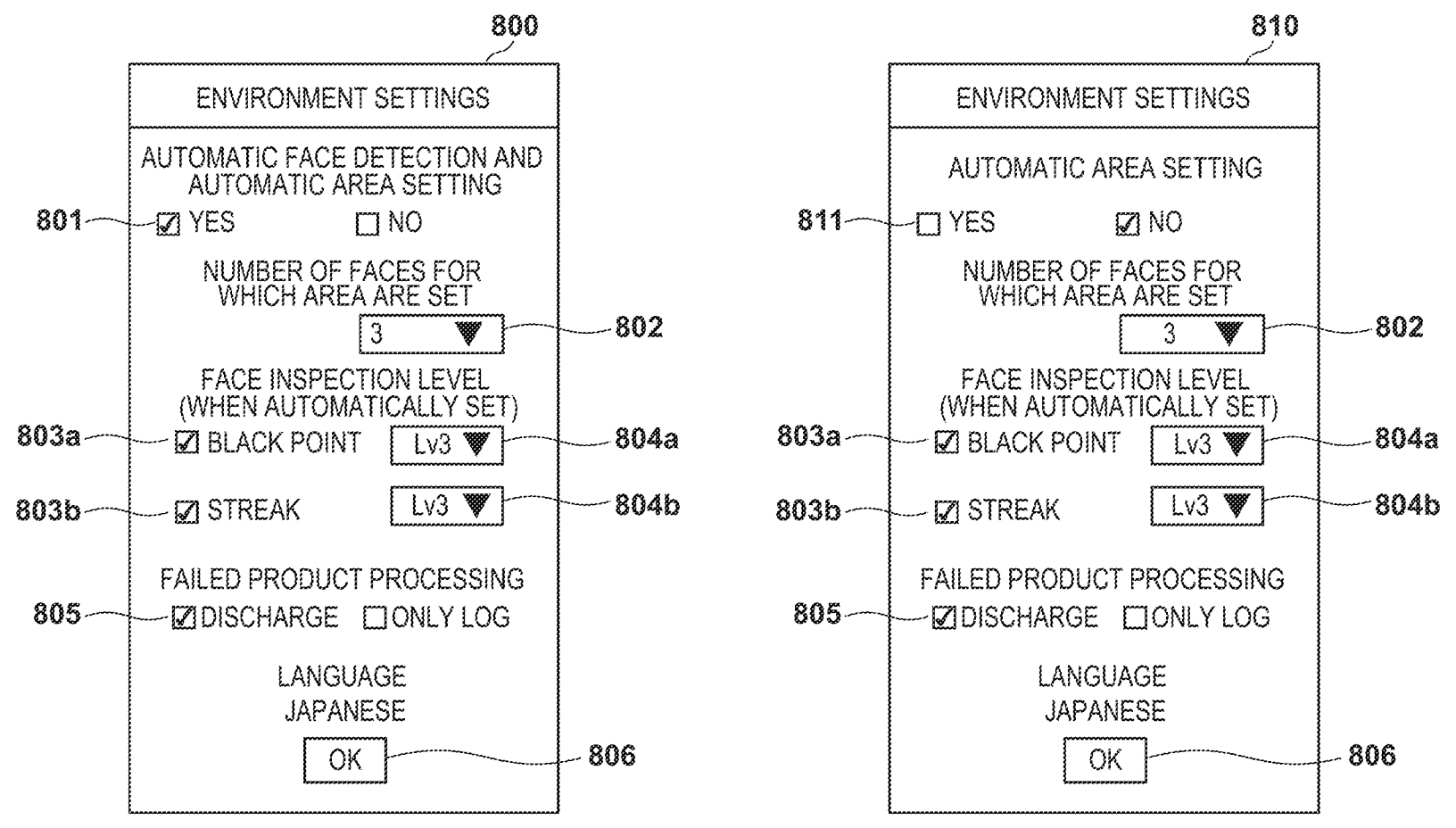

FIG. 8A illustrates a setting screen 800 displayed on the display 241 when the button 506 is operated. The CPU 238 creates environment settings according to an instruction inputted through the setting screen 800 and stores the settings in the memory 239.

A check box 801 is a control object for automatically detecting a human face included in the correct image and selecting whether or not to automatically set an inspection area. A menu 802 is a pull-down menu for selecting the number of faces (upper limit value) for which an inspection area is to be set. A check box 803*a* is a control object for selecting whether or not to execute an inspection item (e.g., black dot detection) in an inspection area. A black dot is a group of black pixels that do not exist in the correct image. A menu 804*a* is a control object for selecting an inspection level of an inspection item (e.g., black dot detection). The inspection level is a parameter that defines the strictness for the inspection item (a criterion for determining a pass). The check box 803*b* is a control object for selecting whether or not to execute an inspection item (e.g., streak detection) in an inspection area. A streak is a group of linear abnormal pixels that are not present in the correct image. A menu 804*a* is a control object for selecting an inspection level of an inspection item (e.g., streak detection). A check box 805 is a control object for selecting processing of failed products (e.g., discharge to the escape tray 346/record to a log). The CPU 238 saves the environment settings in the memory 239 when an OK button 806 is pressed by the user.

The environment settings described here are environment settings that are applied in a case when automatic area setting is enabled. The environment settings may exist independently of environment settings associated with the inspection area that the user manually sets for the correct image.

FIG. 8B illustrates a setting screen 810 displayed on the display 241 when the button 506 is operated. The setting screen 810 is another example of the setting screen 800. A check box 811 is used instead of the check box 801.

The check box 811 is a control object for selecting whether or not to automatically set an inspection area in the correct image. In this case, whether or not to automatically detect a human face included in the correct image may be stored in the memory 239 in advance.

For example, when the check box 811 is checked, a mode in which an inspection area is automatically set for a human face recognized by face recognition processing is selected. In a case when the check box 811 is not checked, a mode, in which the face recognition processing is not executed and an inspection area is manually set, is selected. Note that the face recognition processing may be executed even in a case when the check box 811 is not checked. In this case, a frame may be displayed so as to surround the human face detected by the face recognition processing. The user may set an inspection area by touching the frame.

FIG. 8C illustrates a setting screen 820 displayed on the display 241 when the button 506 is operated. The setting screen 820 is another example of the setting screen 800. The check box 811 and a check box 821 are used instead of the check box 801.

The check box 821 is a control object for selecting whether or not to automatically detect a human face. In this case, there are four modes: (i) a mode in which human faces are automatically detected and an inspection area is automatically set for the detected face, (ii) a mode in which human faces are not automatically detected and an inspection area is automatically set based on a result of edge detection, or the like, (iii) a mode in which human faces are automatically detected and an inspection area is manually set for the detected face, and (iv) a mode in which human faces are not automatically detected and an inspection area is manually set.

FIG. 9 is a flowchart illustrating processing in which the CPU 238 of the inspection apparatus 109 registers correct image data according to a program. Note, when the registration start button 604 is pressed, the CPU 238 executes the following process.

In step S901, the CPU 238 obtains a print setting from the memory 239. The print setting is set through the registration screen 600, and includes, for example, the number of sheets per set, the surface to be read, and the number of images to be read in order to generate correct image data. The print setting may include environment settings made through the setting screen 800. The environment settings are settings that are referred to when a correct image is registered.

In step S902, the CPU 238 determines whether or not the sheet has been conveyed to the inspection apparatus 109 based on the detection result of the sheet sensor 334. When the sheet sensor 334 detects the leading edge of the sheet, the CPU 238 advances the processing from step S902 to step S903.

In step S903, the CPU 238 reads the sheet using the CIS 331 and the CIS 332. The CPU 238 stores the read image data generated by reading the sheet in the memory 239.

In step S904, the CPU 238 converts the resolution of the read image data. There are resolutions suitable for comparing an image to be inspected with a correct image. For example, a low resolution is advantageous for increasing the inspection speed. A high resolution is advantageous in cases when a precise inspection is required. The user may select which resolution is appropriate. In a case when a high resolution is selected, the CPU 238 may skip the resolution conversion.

In step S905, the CPU 238 removes noise from the read image data. When paper dust, or the like, adheres to the CIS 331 and the CIS 332, noise is included in the read image data. Therefore, the CPU 238 executes morphology conversion, or the like, to remove noise from the read image data.

Figure 10:
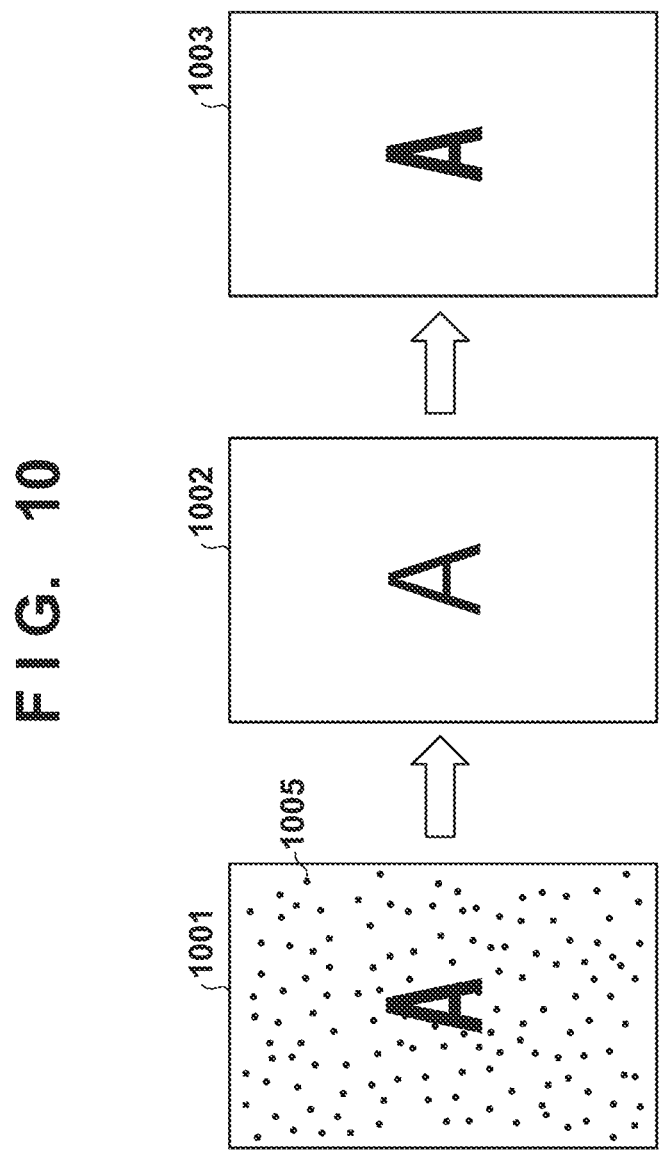
FIG. 10 is a view for describing noise removal.

FIG. 10 is a view for schematically describing a morphology conversion. When paper dust adheres to the CIS 331 and the CIS 332, or the sheet, a read image 1001 contains a large amount of noise 1005. The CPU 238 reduces the read image 1001 and generates a reduction image 1002. This removes the small noise 1005. The CPU 238 executes expansion processing on the reduction image 1002 to generate an image 1003. Thus, the noise 1005 is removed while maintaining the original image formed on the sheet.

In step S906, the CPU 238 determines whether or not the reading of the sheet is completed. For example, the CPU 238 compares the number of sheets included in the print setting with the number of sheets read so far, and determines whether or not the reading is completed. If the reading is not completed, the CPU 238 advances the processing from step S906 to step S902 and starts reading the subsequent sheet. If the reading has completed, the CPU 238 advances the processing from step S906 to step S907.

In step S907, the CPU 238 generates a preview image for a preview display of the read image data obtained from the sheet on the display 241.

In step S908, the CPU 238 displays the preview image and the UI screen on the display 241.

Figure 11:
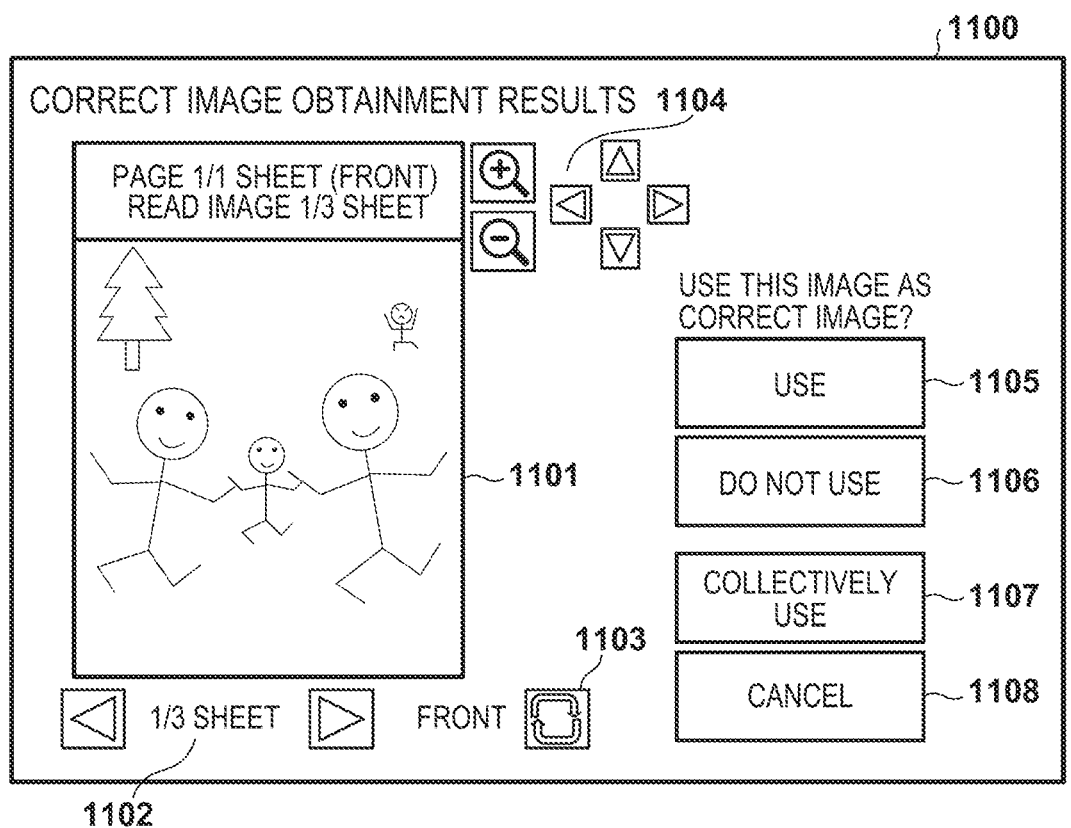
FIG. 11 is a view for describing a UI for selecting candidates for a correct image.

FIG. 11 is a diagram illustrating an exemplary UI screen 1100. An area 1101 is an area for displaying a preview image. In a case when n sheets are read, the CPU 238 detects a user operation on a switching button 1102 and switches the preview images displayed in the area 1101. A switching button 1103 is a button for switching between a preview image of the front side of the sheet and a preview image of the back side of the sheet. The CPU 238 switches between a preview image of the front side of the sheet and a preview image of the back side of the sheet each time a user operation on the switching button 1103 is detected. The switching button 1103 is enabled in a case when an inspection is executed on both sides of the sheet.

An enlargement/reduction button 1104 is a button for enlarging or reducing the preview image displayed in the area 1101. In order to confirm whether or not there is dust or a streak has occurred in the read image, the user can enlarge or reduce the image. The switching buttons 1102 and 1103, and the enlargement/reduction button 1104 are merely examples. The CPU 238 may detect gesture operations such as flicking, pinching, swiping, and the like, and execute switching and scaling of images in response to the gesture operations. In such a case, the operation unit 242 functions as a touch detection sensor mounted on the display 241.

A button 1105 is a button for instructing the CPU 238 to use the original image of the preview image displayed in the area 1101 as a candidate image of the correct image data.

A button 1106 is a button for clearly instructing the CPU 238 not to use the original image of the preview image displayed in the area 1101 as a candidate image of the correct image data. The CPU 238 discards the original image of the preview image for which the button 1106 has been pressed and the original image is not used to obtain correct image data.

A collective use button 1107 is a button for instructing the CPU 238 to collectively use all of the plurality of obtained images in order to obtain correct image data. On the other hand, a cancel button 1108 is a button for instructing the CPU 238 to discard and not to use all of the plurality of obtained images for obtaining correct image data.

When either of the collective use button 1107 and the cancel button 1108 is pressed, or when the use button 1105 or the do not use button 1106 is pressed for all images, the CPU 238 determines that the selection of the original image has been completed.

In step S909, the CPU 238 determines whether or not the selection of the correct image (candidate image) is completed for all the read images. If the selection of the correct image is completed, the CPU 238 advances the processing to step S911. On the other hand, the number of candidate images may be insufficient because the button 1106 has been pressed for some candidate images. In this case, the correct image selection is not completed. As described above, if the correct image selection is not completed, the CPU 238 advances the processing to step S910.

In step S910, the CPU 238 makes a query to the user of whether or not to obtain additional images. When a selection is made to obtain additional images, the CPU 238 advances the processing to step S901 and obtains additional images. On the other hand, when a selection is made to not obtain additional images, the CPU 238 advances the processing to step S911.

In step S911, the CPU 238 reads the image data of the candidate image from the memory 239 and generates correct image data. For example, the CPU 238 superimposes and averages image data of a plurality of candidate images to generate correct image data. The correct image data is stored in the memory 239.

In step S912, the CPU 238 determines whether or not to register the correct image data based on the result of the inquiry to the user. For example, the CPU 238 displays the correct image data on the display 241 and queries the user as to whether or not to register the correct image data. When the user makes an instruction to register the correct image data, the CPU 238 advances the processing to step S913. When the user rejects the registration of the correct image data, the CPU 238 ends the registration processing.

In step S913, the CPU 238 determines whether or not the area auto-setting is enabled based on the environment settings stored in the memory 239. As described using FIG. 8A, in a case when the check box 801 is checked, the CPU 238 determines that the area auto-setting is enabled, and advances the processing to step S914. In a case when the check box 801 is not checked, the CPU 238 advances the processing to step S920 in order to execute manual inspection area setting.

In step S914, the CPU 238 detects human faces in the correct image data based on the environment settings. In a case when the upper limit number is set by the environment settings, the CPU 238 detects a number of faces that does not exceed an upper limit number. For example, the CPU 238 calculates the areas of the detected faces, and detects a number of faces that does not exceed the upper limit number in descending order of area size. Note, in a case when the upper limit number is not set, all faces are detected.

In step S915, the CPU 238 sets inspection areas for faces detected based on the environment settings. Each inspection area is associated with an inspection item and an inspection level included in the environment settings.

In step S920, the CPU 238 manually sets an inspection area. For example, the CPU 238 displays correct image data on the display 241 and sets an inspection area based on a user's instruction inputted through the operation unit 242. Note that, in a case when there is an inspection area that has already been automatically set, but an inspection area is manually added, the CPU 238 may execute the manual setting. Also, the CPU 238 may execute the manual setting in order to delete or to move inspection areas that were already automatically set, or to change the inspection level. In a case when the user does not set a new inspection area, the CPU 238 ends the registration processing for correct image data.

Note that, in step S915, the CPU 238 may set the inspection area for a face detected based on the environment settings, and then display a correct image (e.g., an area 1303 in FIG. 13), including a set inspection area on the display 241. Thus, the user can confirm the inspection area and the correct image.

Processing of Options

Figure 12:
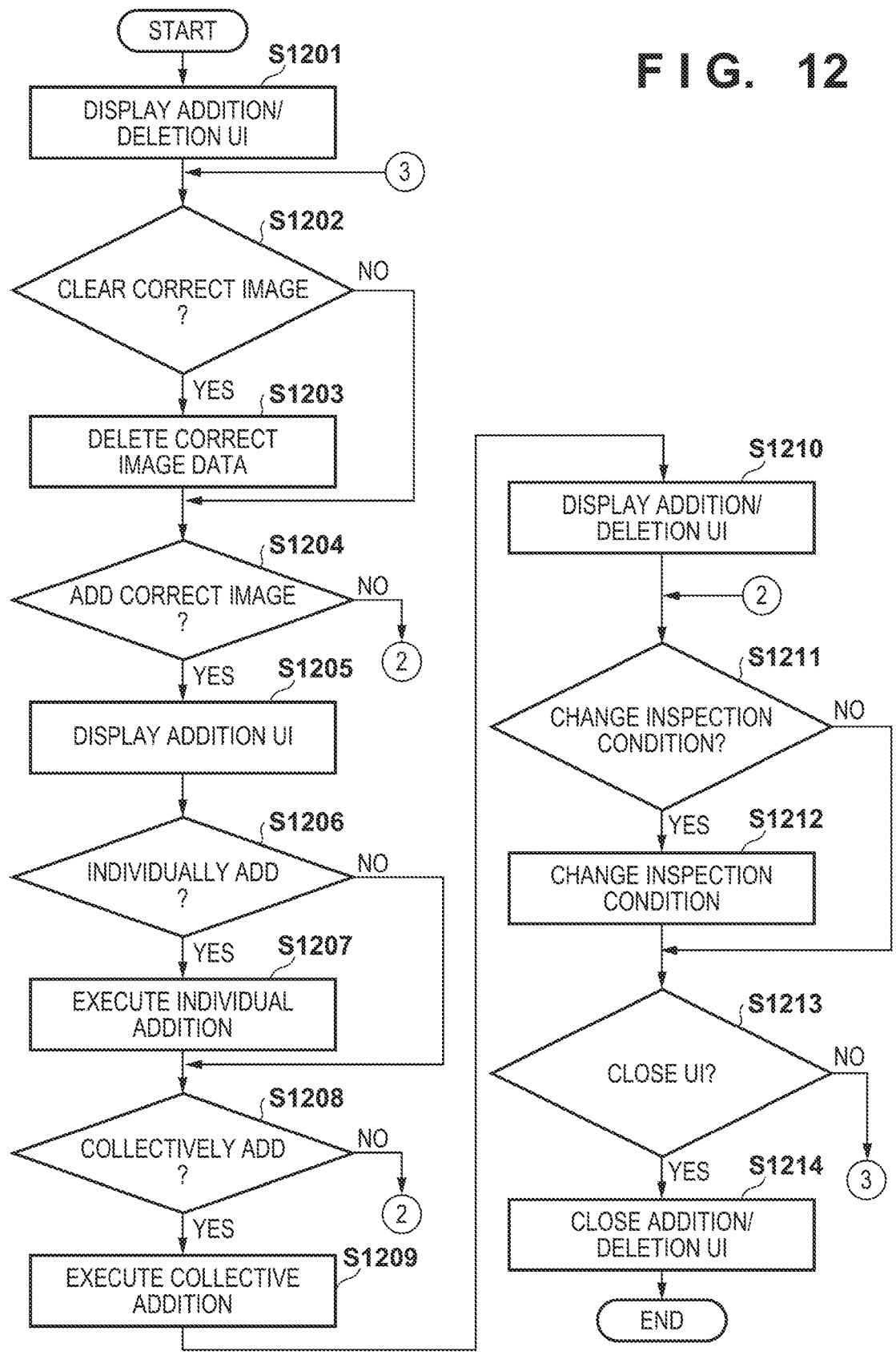
FIG. 12 is a flowchart illustrating addition/deletion of a correct image.

FIG. 12 is a flowchart illustrating optional processing executed after the correct image data is obtained. The CPU 238 executes the following processing according to the program.

In step S1201, the CPU 238 displays an addition/deletion UI for adding or deleting correct image data on the display 241.

FIG. 13 illustrates an exemplary addition/deletion UI 1300. A message 1301 indicates that correct image data has been registered. A message 1302 indicates that inspection areas have already been set for the correct image data. The area 1303 displays a correct image corresponding to the correct image data. Here, the correct image data is image data created by superimposing and averaging a plurality of pieces of image data (e.g., three sheets) read and obtained by the CIS 331 and the CIS 332. In this example, inspection areas 1313 and an inspection area 1315 are each surrounded by a frame line so that the user can understand that the inspection areas 1313 and the inspection area 1315 are set for the correct image. The user can remove the inspection areas 1313 from the inspection target by touching the inspection areas 1313. That is, the user can confirm an inspection area automatically set by the face detection, and remove the inspection area from the inspection target if the inspection area is not required.

A clear button 1304 is a button for instructing the CPU 238 to delete (clear) the correct image data registered in the memory 239. An add button 1305 is a button for instructing the CPU 238 to additionally register correct image data. When a part of the read image is discarded (unused setting) through the setting screen 800, a correct image derived from the read image is not created. In a case when the user wants to obtain an additional correct image, the user presses the add button 1305. When the add button 1305 is pressed, the CPU 238 displays an addition UI on the display 241.

FIG. 14 illustrates an exemplary addition UI 1400. A designation button 1401 is a button for designating pages to be added as correct image data. An add button 1402 is a button for instructing the CPU 238 to individually add pages designated by the designation button 1401. An add button 1403 is a button for instructing the CPU 238 to collectively add all pages. A message 1404 indicates pages to be read. A setting unit 1405 is a control object for setting how many images are to be read for each designated page. A start button 1406 is a button for causing the CPU 238 to start the additional obtaining. When the start button 1406 is pressed, correct image addition processing described in FIG. 9 is executed.

An additionally obtained correct image is displayed in the area 1303 of FIG. 13. Here, the inspection areas 1313 are inspection areas automatically set based on the face recognition result. The inspection area 1315 is an inspection area manually set by an operation on the operation unit 242 by the user (e.g., a mouse drag operation or a touch operation on a touch detection panel). The inspection areas 1313 and 1315 are each displayed to be visually distinguishable. For example, the inspection areas 1313 may be displayed with a blue dotted line frame. The inspection area 1315 may be displayed with a green dotted line frame. The inspection item and the inspection level may be set independently for the inspection areas 1313 and the inspection area 1315. A setting unit 1306 is a control object that accepts a setting of an inspection item and an inspection level associated with the inspection area 1315. A setting unit 1307 is a control object that accepts a setting of an inspection item and an inspection level associated with the inspection areas 1313.

For example, the setting of the inspection item may be realized by checking/unchecking the check box. The inspection level may be set by an up button/down button.

In FIG. 13, an inspection area is automatically set for three faces among the plurality of faces detected based on the environment settings set in advance through the setting screen 800. For example, the areas of a plurality of faces are compared, face evaluation values are determined according to the area, and inspection areas are set for faces having a high evaluation value. However, this is only an example. The CPU 238 may analyze the facial expression of the detected faces to calculate an evaluation value (degree of smile), and may set an inspection area by prioritizing faces having a higher evaluation value. The fact that the inspection is not performed on faces having a low priority means that an image defect existing in an area having a low priority will be allowed. This improves the yield of products (printed materials). For example, an inspection area is not set for a face, and the like (e.g., a spectator) that is accidentally reflected, as in the background of the subject (e.g., a singer) of the document.

Returning to the description of FIG. 12, in step S1202, the CPU 238 determines whether or not to clear the correct image. For example, when the clear button 1304 is pressed, the CPU 238 advances the processing to step S1203. In a case when an instruction to clear the correct image is not made, the CPU 238 advances the processing to step S1204.

In step S1203, the CPU 238 deletes the image data (correct image data) of the correct image displayed in the area 1303 from the memory 239.

In step S1204, the CPU 238 determines whether or not to add a correct image. For example, when the add button 1305 is pressed, the CPU 238 advances the processing to step S1205. In a case when an instruction to add and register the correct image is not made, the CPU 238 advances the processing to step S1211.

In step S1205, the CPU 238 displays the addition UI 1400 on the display 241.

In step S1206, the CPU 238 determines whether or not an instruction to individually add a correct image was made. For example, when an additional page is designated, the add button 1402 is pressed, and the start button 1406 is pressed, the CPU 238 advances the processing to step S1207. In a case when an instruction to individually add the correct image is not made, the CPU 238 advances the processing to step S1208.

In step S1207, the CPU 238 executes an individual addition of correct image data for the designated page. The user instructs the image forming apparatus 107 to print the designated page. Thereafter, the registration processing illustrated in FIG. 9 is executed.

In step S1208, the CPU 238 determines whether or not an instruction to collectively add correct images was made. For example, when the add button 1403 is pressed, and the start button 1406 is pressed, the CPU 238 advances the processing to step S1209. In a case when an instruction to collectively add the correct images is not made, the CPU 238 advances the processing to step S1211.

In step S1209, the CPU 238 executes a collective addition of correct image data for all pages. The user instructs the image forming apparatus 107 to print all pages. Thereafter, the registration processing illustrated in FIG. 9 is executed.

In step S1210, the CPU 238 displays the addition/deletion UI 1300 on the display 241.

In step S1211, the CPU 238 determines whether or not the change of the inspection condition is instructed through the addition/deletion UI 1300. When an instruction to change the inspection condition is made, the CPU 238 advances the processing to step S1212. When an instruction to change the inspection condition is not made, the CPU 238 advances the processing to step S1213.

In step S1212, the CPU 238 changes inspection conditions (e.g., inspection levels, inspection items, and inspection areas) in accordance with a user instruction inputted from the operation unit 242. The changed inspection condition is stored in the memory 239 in association with the correct image data displayed in the area 1303.

In step S1213, the CPU 238 determines whether or not an instruction has been made to close the addition/deletion UI 1300. When an instruction is made to close the addition/deletion UI 1300 through the operation unit 242, the CPU 238 advances the process to step S1214. When an instruction to close the addition/deletion UI 1300 is not made, the CPU 238 advances the processing to step S1202.

In step S1214, the CPU 238 closes the addition/deletion UI 1300.

(5) Image Inspection

Figure 15:
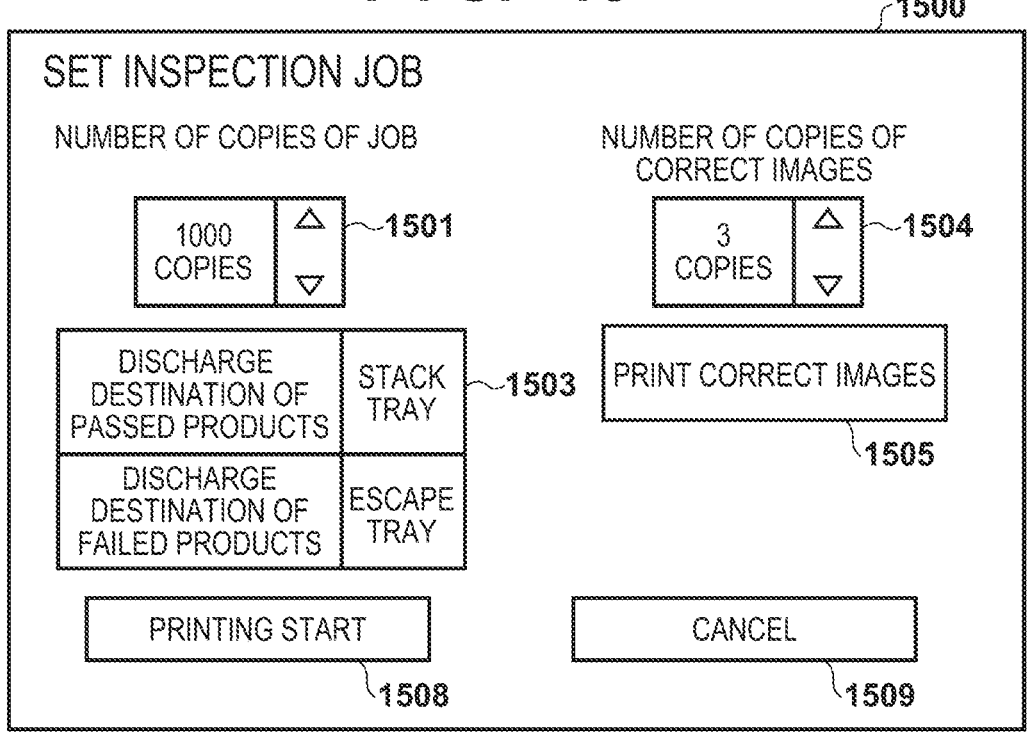
FIG. 15 is a view for describing a UI for setting an inspection job.

FIG. 15 illustrates an example of a setting screen 1500 of the inspection job displayed on the display 212 of the external controller 102. The CPU 208 of the external controller 102 instructs the inspection apparatus 109 to convey the sheet of the correct image and the sheet to be inspected to the image forming system 101.

A setting unit 1501 is a control object for setting the number of copies of an inspection target (e.g., one thousand copies). A setting unit 1503 is a control object for setting a discharge destination (e.g., the stack tray 341) for sheets determined to be a passed product and a discharge destination (e.g., the escape tray 346) for sheets determined to be a failed product, respectively. Note that the discharge destination of a passed product and the discharge destination of a failed product may be the same. In this case, the user confirms a list of inspection results displayed on the displays 212, 225, and 241, and manually extracts a sheet that has become a failed product. For example, the image forming system 101 may shift a sheet of the passed product and a sheet of the failed product in a direction orthogonal to the conveyance direction and discharge them to the same tray based on the inspection result provided from the inspection apparatus 109. This makes it easier to extract a failed product.

A button 1504 is a button for designating the number of copies of correct images. When the registration start button 604 is pressed, the inspection apparatus 109 is instructed to start registration of correct image data. After that, the user sets the number of copies by using the button 1504, and makes an instruction to start printing the correct images by using the button 1505. The image forming apparatus 107 prints a correct image based on an instruction from the external controller 102. The inspection apparatus 109 executes reading of a correct image based on an instruction from the external controller 102.

When the registration start button 604 is pressed, the inspection apparatus 109 may instruct the external controller 102 to print N copies of the correct image of via the communication cable 254 and the internal LAN 105. Similarly, when the start button 1406 is pressed, the inspection apparatus 109 may instruct the external controller 102 to print specific/all pages.

A print start button 1508 is a button for instructing the image forming system 101 to start the printing of an inspection target. When the print start button 1508 is pressed, the external controller 102 transmits an inspection job based on the print conditions set through the setting screen 1500 to the image forming apparatus 107.

After the user instructs the inspection apparatus 109 to start the inspection with the button 507, the user instructs the external controller 102 to start printing of the inspection target with the print start button 1508. The external controller 102 transmits print data to the image forming apparatus 107 and instructs the image forming apparatus 107 to convey the printed sheet to the inspection apparatus 109. When it is detected that the sheet has been conveyed, the inspection apparatus 109 reads an image of the sheet to create inspection image data, compares the inspection image data with the correct image data, and determines whether the printing passed or failed.

A cancel button 1509 is a button for instructing the CPU 208 to cancel display of the setting screen 1500 of the inspection job without performing a print.

Note that, when the print start button 1508 is pressed to instruct the start of printing of an inspection target, the external controller 102 may instruct the inspection apparatus 109 to start the inspection. In this case, the inspection apparatus 109 may notify in advance whether or not the correct image data has been registered in the external controller 102. In a case when the correct image data is not registered in the inspection apparatus 109, the external controller 102 may reject printing of the inspection target.

Figure 16:
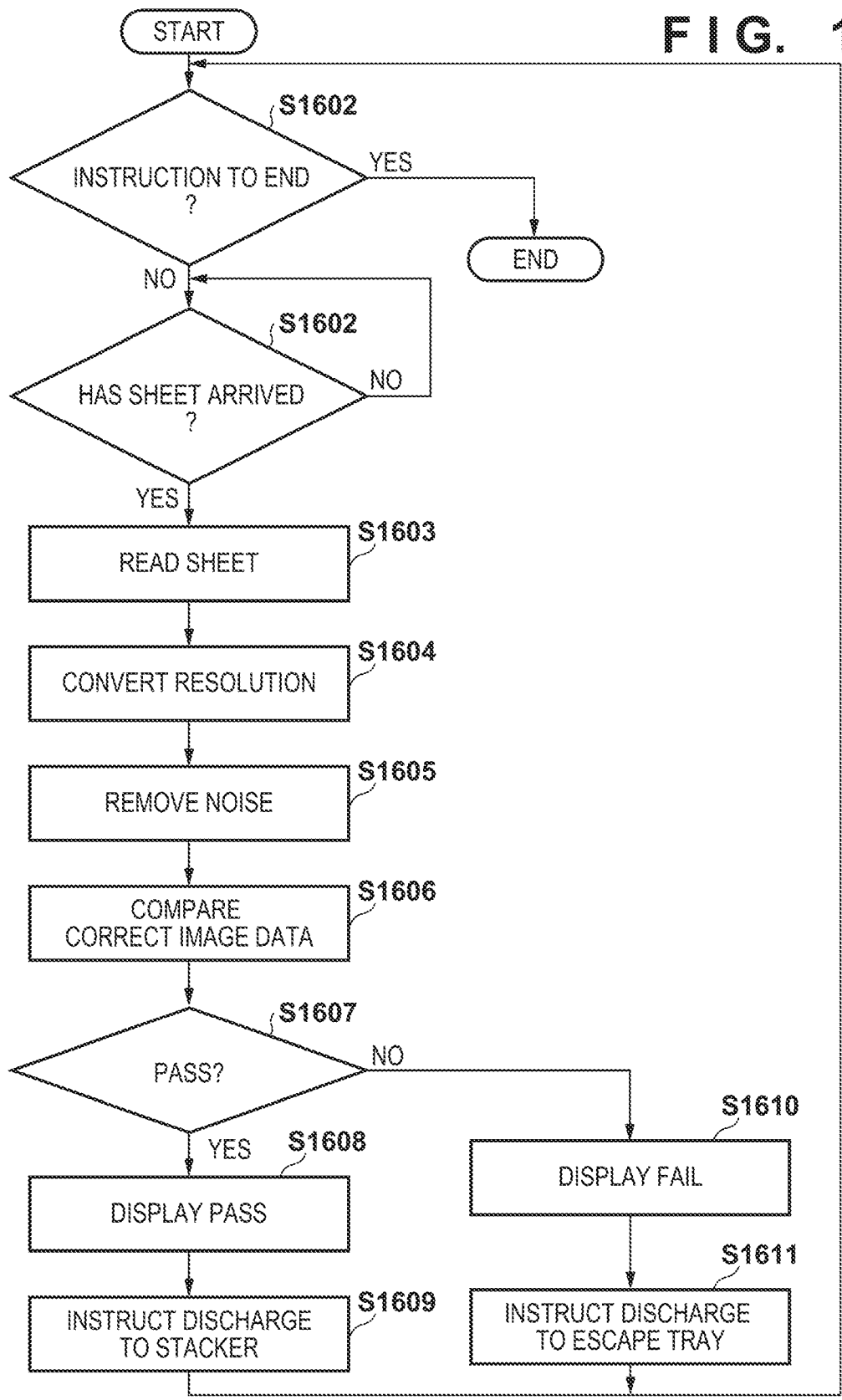
FIG. 16 is a flowchart for describing an image inspection method.

FIG. 16 is a flowchart illustrating the inspection processing executed by the CPU 238 of the inspection apparatus 109 according to a program.

In step S1601, the CPU 238 determines whether an instruction to end the inspection processing is received from the operation unit 242 or the external controller 102. When the end instruction is received, the CPU 238 ends the series of inspection processing illustrated in FIG. 16. If the end instruction is not received, the CPU 238 advances the processing to step S1602.

In step S1602, the CPU 238 determines whether or not a sheet has arrived at the inspection apparatus 109. For example, the CPU 238 determines whether or not the leading edge of the sheet is detected based on the detection result of the sheet sensor 334 installed near the entrance of the inspection apparatus 109. When the sheet arrives at the inspection apparatus 109, the CPU 238 advances the processing to step S1603.

In step S1603, the CPU 238 controls the CIS 331 and the CIS 332 to read the sheet. The CPU 238 stores image data to be inspected, which is a read result, in the memory 239.

In step S1604, the CPU 238 converts the resolution of the image data to be inspected. There are resolutions suitable for comparing an image to be inspected with a correct image. For example, a low resolution is advantageous for increasing the inspection speed. A high resolution is advantageous in cases when a precise inspection is required. The user may select which resolution is appropriate. In any case, the resolution of the image data to be inspected must match the resolution of the correct image data. In a case when a high resolution is selected, the CPU 238 may skip the resolution conversion.

In step S1605, the CPU 238 removes noise from the image data to be inspected. When paper dust, or the like, adheres to the CIS 331 and the CIS 332, noise is included in the read image data. Therefore, the CPU 238 executes morphology conversion, or the like, to remove noise from the read image data.

In step S1606, the CPU 238 compares the image data to be inspected with the correct image data. The correct image data is stored in advance in the memory 239. Note that the comparison processing is executed in accordance with the inspection area, the inspection item, and the inspection level associated with the correct image data.

In step S1607, the CPU 238 determines whether or not the inspection image passes based on the comparison result. If the inspection image satisfies the pass criteria, the CPU 238 advances the processing to step S1608. In step S1608, the CPU 238 displays on the display 241 that the inspection result has passed.

In step S1609, the CPU 238 instructs the image forming apparatus 107 to discharge the passed sheet to the stack tray 341 of the large-capacity stacker 110. Here, the discharge destination is a discharge destination set by the setting unit 1503. The image forming apparatus 107 instructs the large-capacity stacker 110 to discharge the sheet to the stack tray 341 based on an instruction from the inspection apparatus 109. Thereafter, the CPU 238 advances the processing to step S1601 and executes an inspection of the subsequent sheet.

On the other hand, if the inspection result is a failure in step S1607, the CPU 238 advances the processing to step S1610.

In step S1610, the CPU 238 displays on the display 241 that the inspection result has failed. In step S1611, the CPU 238 instructs the image forming apparatus 107 to discharge the sheet to the escape tray 346 of the large-capacity stacker 110. Here, the discharge destination is a discharge destination set by the setting unit 1503. The image forming apparatus 107 instructs the large-capacity stacker 110 to discharge the sheet to the escape tray 346 based on an instruction from the inspection apparatus 109. Thereafter, the CPU 238 advances the processing to step S1601 and executes an inspection of the subsequent sheet.

By virtue of this embodiment, the CPU 238 can determine the pass or fail of an inspection target by registering the correct image data and comparing the image data to be inspected with the correct image data.

Figure 17:
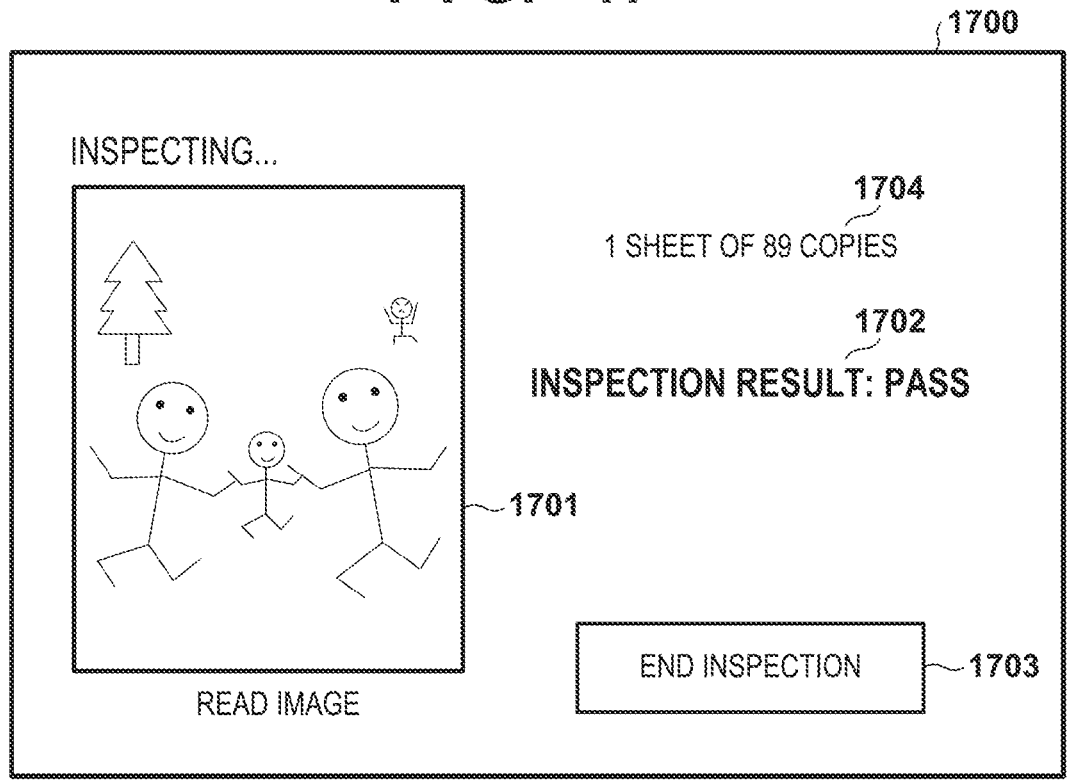
FIG. 17 is a view for describing a UI for displaying an inspection result.

FIG. 17 illustrates an example of an inspection screen 1700 displayed on the display 241 when the button 507 is pressed. An area 1701 displays an image (inspection image) of the sheet last read by the inspection apparatus 109. A message 1702 indicates whether the inspection image displayed in area 1701 is a pass (OK) or a fail (NG). The inspection image is determined to be a pass. An area 1704 indicates how many images (sheets) currently being inspected are in the inspection job.

An inspection end button 1703 is a button for instructing the CPU 238 to end the inspection. When the inspection end button 1703 is pressed, the CPU 238 displays the UI screen 500 on the display 241.

Figure 18:
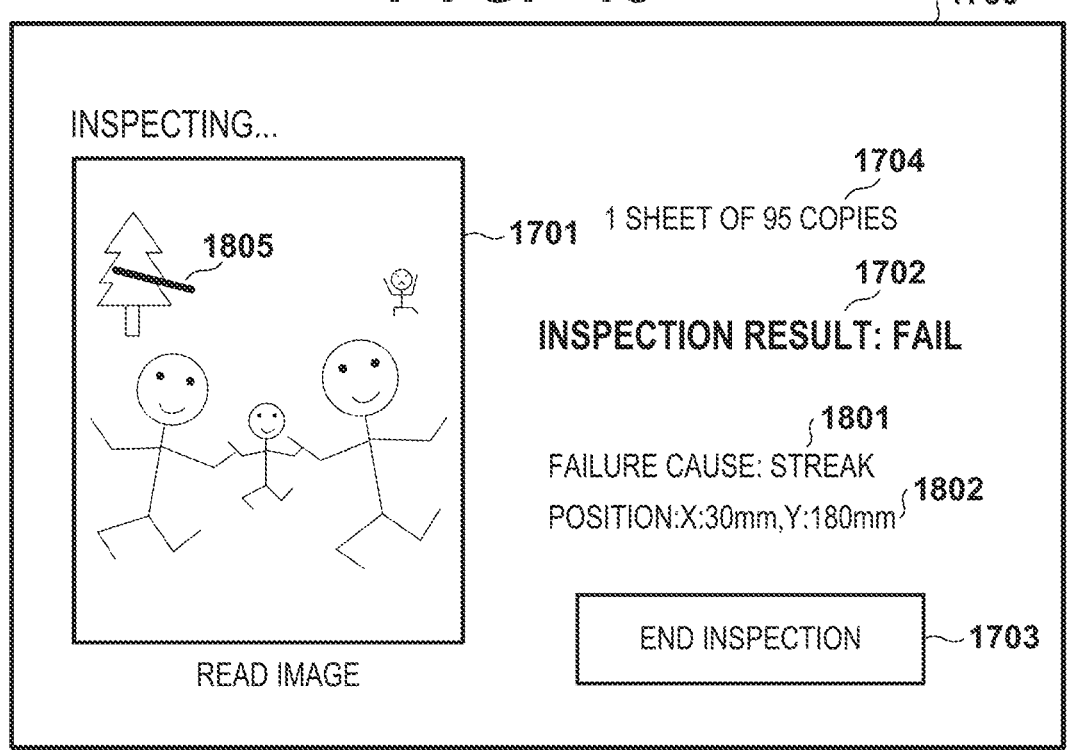
FIG. 18 is a view for describing a UI for displaying an inspection result.

FIG. 18 illustrates an example of the inspection screen 1700 when the inspection image is determined to be a failed image. The message 1702 indicates that the inspection result failed. A cause display unit 1801 indicates a cause of failure. In this example, the inspection image displayed in the area 1701 includes a streak 1805. Therefore, the CPU 238 display units, on the cause display unit 1801, that a streak exists in the inspection area as a cause of failure. The position display unit 1802 indicates a position where a cause of failure exists in the inspection image. In this example, the position display unit 1802 displays the position of the streak 1805.

By virtue of this embodiment, the CPU 238 detects faces in the correct image and sets inspection areas for the detected faces. Therefore, the work load of the user for setting the inspection areas is reduced.

(6) CPU Functions

Figure 19:
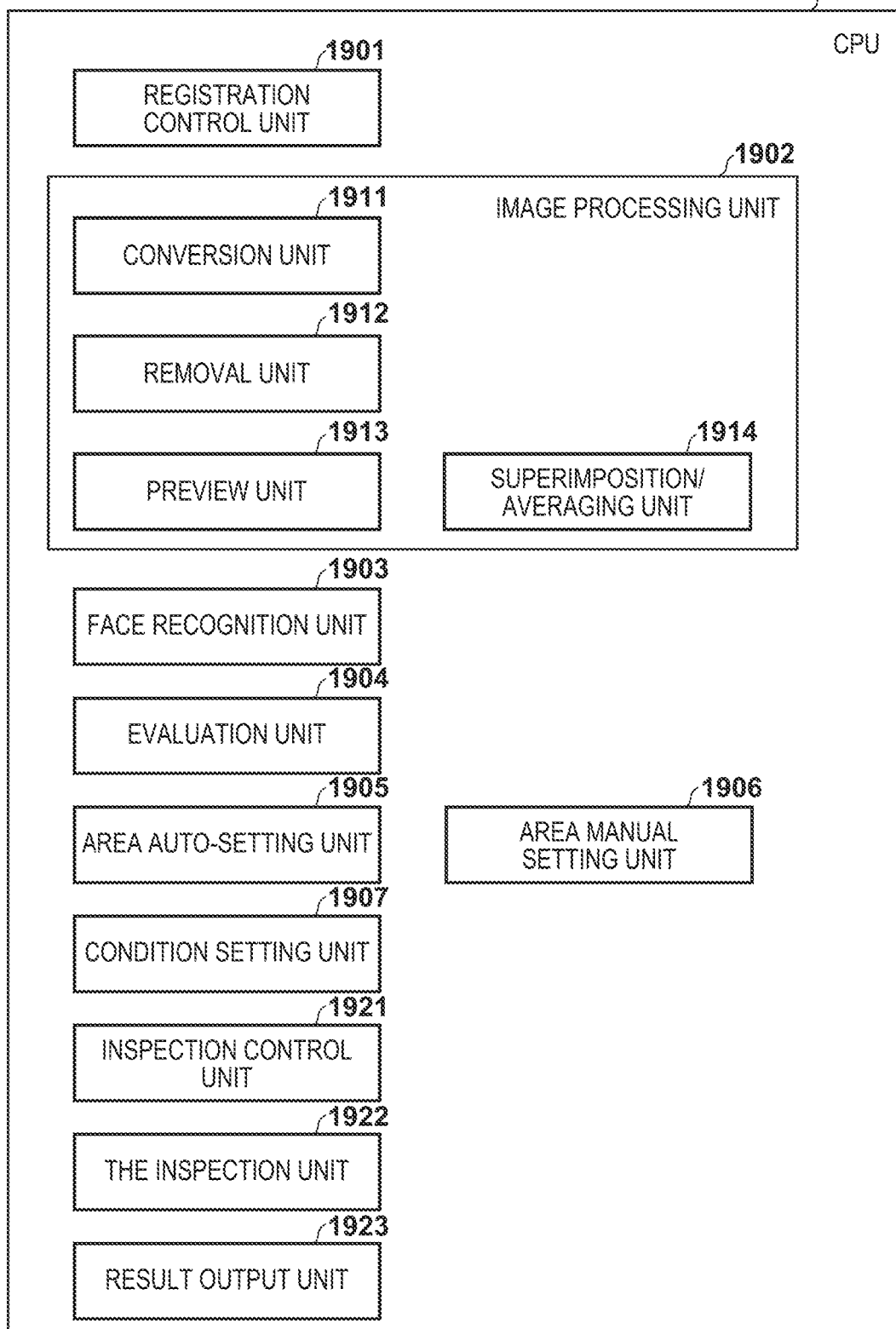
FIG. 19 is a view for describing functions realized by a CPU.

FIG. 19 illustrates an example of functions that the CPU 238 of the inspection apparatus 109 realizes according to a program. The registration control unit 1901 controls registration of correct images. For example, a registration control unit 1901 displays a UI on the display 241 or accepts an instruction from a user through a UI. An image processing unit 1902 applies various image processing to the image data obtained by the CIS 331 and the CIS 332. A conversion unit 1911 converts the resolution of the image data. A removal unit 1912 reduces noise included in the image data outputted from the conversion unit 1911. A preview unit 1913 generates a preview image by reducing the image data outputted from the removal unit 1912. A superimposition/averaging unit 1914 executes superimposition and averaging on the image data outputted from the removal unit 1912. As a result, the superimposition/averaging unit 1914 generates correct image data in the registration mode and generates inspection image data in the inspection mode.

A face recognition unit 1903 analyzes correct image data and detects a human face. Note, there is a method of extracting skin color data from image data and extracting an area determined as a skin color range as a face area, as a method of face detection, for example. There is also a method that focuses on facial components, such as eyes, nose, and mouth. In addition, there are also methods, such as using elliptical shape information focusing on a contour of a face. As described above, the present embodiment can be adopted by any method, as long as the method can detect a face. An evaluation unit 1904 calculates an evaluation value of the face recognized by the face recognition unit 1903. The evaluation value includes a face area, a facial expression, a distance from a subject, or the like. The face recognition unit 1903 may add two or more individual evaluation values to obtain a sum. Note, the calculation of the evaluation value may be executed by an area auto-setting unit 1905. The area auto-setting unit 1905 sets an inspection area on a face recognized by the face recognition unit 1903 based on an evaluation value and an environment condition set by the condition setting unit 1907 through the setting screen 800. The area auto-setting unit 1905 stores the inspection item and the inspection level in the memory 239 in association with the inspection area. The area manual setting unit 1906 determines an inspection area, and an inspection item and an inspection level associated with the inspection area at an arbitrary position based on a user instruction input through the operation unit 242. The position, the inspection item, and the inspection level of the inspection area associated with the correct image data are stored in the memory 239 as inspection conditions.

The inspection control unit 1921 controls the inspection processing illustrated in FIG. 16. An inspection unit 1922 applies inspection conditions to the inspection image data generated by the image processing unit 1902 and the correct image data read from the memory 239, and determines whether the inspection image data passes or fails. The result output unit 1923 displays the inspection result on the display 241 and transmits the inspection result to the inspection control unit 1921 and to the external controller 102. The inspection control unit 1921 sets the discharge destination of the sheet in the image forming apparatus 107 according to the inspection result.

(7) Technical Concepts Derived from the Embodiment

Item 1

The CIS 331 and the CIS 332 are exemplary image sensors that read a sheet on which a correct image is printed to obtain first read data. The CPU 238 executes the various operations according to a program. For example, the CPU 238 may execute an operation for accepting a selection of either a first mode for automatically setting an inspection area or a second mode for manually setting an inspection area, an operation for obtaining first read data by reading, by an image sensor, a sheet on which a correct image has been printed, a generation operation for generating correct data based on the first read data; an operation of, when the first mode is selected, executing face recognition processing on the correct data, and setting an inspection area based on the recognition result of the face recognition processing, an operation of, when the second mode is selected, accepting a designation of an inspection area for the correct data, and an inspection operation for inspecting whether or not a sheet on which an image to be inspected has been printed is a passed product by comparing second read data obtained by reading, by an image sensor, a sheet on which an image to be inspected has been printed and the correct data in the inspection area.

The inspection apparatus 109 is an example of an image processing apparatus. The image processing apparatus may be realized by the PC 103. When the user selects the first mode, the inspection area is automatically set. This reduces a burden on the user in the image inspection. On the other hand, there are users who wish to manually set the inspection area. In this case, the user can manually set the inspection area by selecting the second mode.

Item 2

An inspection level may be set for each inspection area. This makes it possible to change the details of the inspection for each inspection area. For example, a high inspection level may be set for a subject face, and a low inspection level may be set for the face positioned in the background. This would improve the yield of the inspection.

Item 3

As described in relation to FIG. 13, the CPU 238 may set each of the plurality of faces as inspection targets, or may set some of the faces among the plurality of faces as non-inspection targets. Note that setting some of the faces as non-inspection targets includes not setting some of the faces as inspection targets.

Item 4

By displaying the faces set as the inspection target as illustrated in FIG. 13, the user can confirm whether or not the automatic setting of the inspection area has worked well. The CPU 238 may delete an automatically set inspection area, change the size of an inspection area, or move an inspection area in response to a user operation inputted from the operation unit 242. By providing the user with such modifications to the inspection area, the inspection can be executed more in line with the user's wishes.

Item 5

As illustrated in FIG. 13, a frame line may be added to a face set as an inspection target, and a frame line need not be added to a face not set as an inspection target. Accordingly, the user can visually distinguish between faces set as an inspection target and faces not set as an inspection target.

Item 6

A frame surrounding a face set as an inspection target in the correct data may be displayed. However, an indicator or a mark other than the frame may be displayed.

Item 7

An evaluation value of each face of a plurality of recognized faces may be calculated. In this case, a face to be inspected may be selected based on the evaluation values of each of the plurality of faces.

Item 8

A setting operation may be selected as an inspection target by prioritizing a face having a high evaluation value among the plurality of recognized faces.

As a result, the inspection can be executed efficiently. In addition, the inspection time will be shortened.

Item 9

The image processing apparatus according to item 7, wherein an evaluation value may include an area of the recognized face. In this case, a face having a large area may be prioritized and selected as an inspection target.

A face having a large area is likely to be a subject face. On the other hand, a face having a small area is likely to be merely in the background. Therefore, by focusing on the area of a face, it is possible to accurately extract a face that needs to be inspected.

Item 10

Among a plurality of faces, a predetermined number of faces having a relatively large face area may be selected as an inspection target.

In this way, a predetermined number of faces may be selected in descending order of evaluation value. By limiting the number of faces to be inspected, the inspection speed is improved.

Item 11

The image processing apparatus according to item 7, wherein an evaluation value of an expression on each face of a plurality of extracted faces may be calculated. Among the plurality of recognized faces, faces having a high evaluation value may be prioritized and selected as inspection targets.

Thus, a human facial expression may be a criterion for determining whether or not a face is a subject. Therefore, by focusing on an evaluation value of a facial expression, it is possible to accurately extract a face that needs to be inspected.

Item 12

The evaluation value of the smiling face may be calculated to be high, and the evaluation value of the non-smiling face may be calculated to be low.

Empirically, a smiling face is likely to be a subject face. Therefore, by increasing the evaluation value of a smiling face and decreasing the evaluation value of a non-smiling face, it is possible to accurately extract a face that needs to be inspected.

Item 13

An evaluation value of an area and an evaluation value of an expression for each face of the extracted plurality of faces may be calculated. Among the plurality of recognized faces, faces having a high sum of the evaluation value for the area and the evaluation value for the facial expression may be prioritized and selected as inspection targets.

As described above, the CPU 238 may obtain a sum by adding the evaluation value for the area and the evaluation value for the facial expression, and, preferentially, select a face having a high sum of the evaluation values as the inspection target.

Item 14

The large-capacity stacker 110 and the finisher 111 are examples of discharge apparatuses that change a discharge destination of a sheet in accordance with an inspection result of the inspection apparatus. The discharge apparatus discharges a sheet to a discharge port corresponding to an inspection result outputted from the inspection apparatus among the plurality of discharge ports.

Item 15

The stack tray 341 is an example of a first discharge tray that discharges a sheet determined to be a passed product by the inspection apparatus. The escape tray 346 is an example of a second discharge tray that discharges a sheet determined to be a failed product by the inspection apparatus.

As a result, the user can eliminate the trouble of sorting passed products and failed products.

Item 16

Passed products and failed products may be discharged to the escape tray 346. In this case, the displays 241 and 225 may display a list of inspection results of the inspection apparatus.

In this way, in a case when the passed products and failed products are discharged to the same tray, the user can extract and discard the failed products with reference to the list of inspection results.

Item 17

Image inspection methods are also provided.

Item 18

A program is also provided.

Other

According to the above-described examples, an area including a face is detected as an inspection area by the face recognition processing. However, the CPU 238 is not limited to detecting a face, and may detect an area including content such as a photograph, a figure, or a character. Note that a face, a photograph, a figure, or a character may be referred to as content. In this case, the face area described above may be referred to as a content area. That is, the CPU 238 may automatically set the content area in the reference image, or may accept manual setting of the content area in the reference image. Further, the CPU 238 may display a setting screen for setting the inspection level for the set content area on the display 241. The CPU 238 may detect the content area from the read images generated from the sheets to be inspected, and inspect the content area according to the set inspection level.

Note, the face recognition unit 1903 functions as a detection unit for a content area.

Note, as illustrated in FIG. 8A to FIG. 8C, the display 241 may display a screen for selecting whether or not to enable setting of an inspection level corresponding to an area of content detected by the detection unit. Alternatively, the display 241 may display a screen for selecting whether or not to execute detection of the area of the content by the detection unit.

The user may make a selection to not to enable setting the inspection level corresponding to the content area to be detected. In this case, the CPU 238 may accept, through the operation unit 242, the setting of an area for which the inspection level is set and the setting of the inspection level for the area.

The user may make a selection to enable setting the inspection level corresponding to the content area detected. Also, in this case, the CPU 238 may accept, through the operation unit 242, the setting of an area for which the inspection level is set and the setting of the inspection level for the area.

In a case when the content area is automatically detected, the CPU 238 may accept a user operation for releasing the detected content area through the operation unit 242.

The processing related to the setting of the inspection apparatus 109 and the processing related to the inspection may be executed by the PC 103.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., an application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., a central processing unit (CPU), or a micro processing unit (MPU)) and may include a network of separate computers or separate processors to read out and to execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An inspection system comprising:
a reading apparatus configured to read an image formed on a sheet and to output a read image;
a display configured to display a setting screen for setting an inspection condition for inspecting the read image; and
a processor configured to set the inspection condition including an inspection area of an image, a type of inspection, and an inspection level, wherein the inspection area is automatically set by the processor analyzing a content of a reference image,
wherein operation through the setting screen enables displaying the inspection area automatically set by the processor, enabling selection of a specific type of inspection for the inspection area from a plurality of inspection types, and setting an inspection level for the specific type of inspection.

2. The inspection system according to claim 1, wherein the inspection area includes an area of a human face.

3. The inspection system according to claim 1, wherein the display, in a case when a selection has been made not to set the inspection level by disabling the specific type of inspection corresponding to the automatically set inspection area through the setting screen, accepts a manual setting of an area for which the inspection level is to be set and a manual setting of the inspection level for the area for which the inspection level is to be set manually.

4. The inspection system according to claim 1, wherein the display, in a case when a selection has been made to set the inspection level by enabling the specific type of inspection corresponding to the automatically set inspection area through the setting screen, accepts a manual setting of an area for which the inspection level is to be set and a manual setting of the inspection level for the area for which the inspection level is to be set manually.

5. The inspection system according to claim 4, wherein the display displays the automatically set inspection area and an area, an inspection level of which is manually set by a user through the setting screen, such that the automatically set inspection area and the area, the inspection level of which is manually set by the user, are distinguishable from each other.

6. The inspection system according to claim 5, wherein the display displays a frame so as to surround the automatically set inspection area.

7. The inspection system according to claim 1, wherein the display, in a case when a selection has been made to set the inspection level by enabling the specific type of inspection corresponding to the automatically set inspection area through the setting screen, accepts an operation for releasing the automatically set inspection area as an area for which an inspection level is to be set.

8. An image forming system comprising:
an image forming apparatus configured to form an image on a sheet;
a reading apparatus configured to read an image formed on a sheet and to output a read image;
a display configured to display a setting screen for setting an inspection condition for inspecting the read image, the inspection condition including an inspection area of an image, a type of inspection, and an inspection level; and
a processor configured to set the inspection condition, wherein the inspection area is automatically set by the processor analyzing a content of a reference image,
wherein operation through the setting screen enables displaying the inspection area automatically set by the processor, enabling selection of a specific type of inspection for the inspection area from a plurality of inspection types, and setting an inspection level for the specific type of inspection.

9. The image forming system according to claim 8, wherein the inspection area includes an area of a human face.

10. The image forming system according to claim 8, wherein the display, in a case when a selection has been made not to set the inspection level by disabling the specific type of inspection corresponding to the automatically set inspection area through the setting screen, accepts a manual setting of an area for which the inspection level is to be set and a manual setting of the inspection level for the area for which the inspection level is to be set manually.

11. The image forming system according to claim 8, wherein the display, in a case when a selection has been made to set the inspection level by enabling the specific type of inspection corresponding to the automatically set inspection area through the setting screen, accepts a manual setting of an area for which the inspection level is to be set and a manual setting of the inspection level for the area for which the inspection level is to be set manually.

12. The image forming system according to claim 11, wherein the display displays the automatically set inspection area and an area, an inspection level of which is manually set by a user through the setting screen, such that the automatically set inspection area and the area, the inspection level of which is manually set by the user, are distinguishable from each other.

13. The image forming system according to claim 12, wherein the display displays a frame so as to surround the automatically set inspection area.

14. The image forming system according to claim 8, wherein the display, in a case when a selection has been made to set the inspection level by enabling the specific type of inspection corresponding to the automatically set inspection area through the setting screen, accepts an operation for releasing the automatically set inspection area as an area for which an inspection level is to be set.

* * * * *